United States Patent
Sun et al.

(10) Patent No.: US 9,337,487 B2
(45) Date of Patent: May 10, 2016

(54) POSITIVE ELECTRODE ACTIVE MATERIAL PRECURSOR FOR LITHIUM SECONDARY BATTERY, POSITIVE ELECTRODE ACTIVE MATERIAL MANUFACTURED BY USING THEREOF, AND LITHIUM SECONDARY BATTERY INCLUDING SAME

(71) Applicants: IUCF-HYU (INDUSTRY-UNIVERSITY COOPERATION FOUNDATION HANYANG UNIVERSITY), Seoul (KR); ENERCERAMIC INC, Seoul (KR)

(72) Inventors: Yang-Kook Sun, Seoul (KR); Hyung-Joo Noh, Bucheon-si (KR); Jang-Wook Park, Bucheon-si (KR)

(73) Assignees: IUCF-HYU (INDUSTRY-UNIVERSITY COOPERATION FOUNDATION HANYANG UNIVERSITY), Seoul (KR); ENERCERAMIC INC, Seoul (KR)

( * ) Notice: Subject to any disclaimer, the term of this patent is extended or adjusted under 35 U.S.C. 154(b) by 80 days.

(21) Appl. No.: 14/118,661

(22) PCT Filed: Jun. 10, 2013

(86) PCT No.: PCT/KR2013/005084
§ 371 (c)(1),
(2) Date: Nov. 19, 2013

(87) PCT Pub. No.: WO2013/183974
PCT Pub. Date: Dec. 12, 2013

(65) Prior Publication Data
US 2014/0158932 A1 Jun. 12, 2014

(30) Foreign Application Priority Data

Jun. 8, 2012 (KR) .................. 10-2012-0061836
Oct. 16, 2012 (KR) .................. 10-2012-0115047
Jun. 10, 2013 (KR) .................. 10-2013-0065711

(51) Int. Cl.
*H01M 4/485* (2010.01)
*H01M 4/13* (2010.01)
(Continued)

(52) U.S. Cl.
CPC ............ *H01M 4/525* (2013.01); *C01G 53/006* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS

2004/0175618 A1* 9/2004 Inoue ................. C01G 51/42
429/231.1
2004/0265693 A1* 12/2004 Kurachi ............. C01G 51/42
429/231.1
(Continued)

FOREIGN PATENT DOCUMENTS

KR 1020070116158 A 12/2007
KR 10-2013-0065711 * 6/2013

OTHER PUBLICATIONS

Hyung-Joo Noh, et al; Formation of a continuous solid-solution particle and its application to rechargeable lithium batteries; Adv. Funct. Mater.; 2013; vol. 23; pp. 1028-1036.
Korean Office Action dated Sep. 29, 2014 for Application No. 10-2013-0065711 and English translation.
(Continued)

*Primary Examiner* — Harold Pyon
*Assistant Examiner* — Katie L Hammer
(74) *Attorney, Agent, or Firm* — Lucas & Mercanti, LLP

(57) ABSTRACT

The present disclosure relates to a positive electrode active material precursor for a lithium secondary battery, a positive electrode active material manufactured by using thereof, and a lithium secondary battery comprising the same. More specifically, it relates to a positive electrode active material precursor for a lithium secondary battery as a secondary particle comprising transition metals, and formed by gathering of a plurality of primary particles having different a-axis direction length to c-axis direction length ratio, wherein the a-axis direction length to c-axis direction length ratio of the primary particle making up the secondary particle is increased from the center to the surface of the secondary particle; a positive electrode active material; and a lithium secondary battery comprising the same.

24 Claims, 13 Drawing Sheets

(51) Int. Cl.
*H01M 4/525* (2010.01)
*H01M 4/505* (2010.01)
*C01G 53/00* (2006.01)
*H01M 10/052* (2010.01)
*H01M 4/131* (2010.01)
*H01M 4/02* (2006.01)

(52) U.S. Cl.
CPC ......... *H01M 10/052* (2013.01); *C01P 2002/80* (2013.01); *C01P 2004/04* (2013.01); *H01M 4/131* (2013.01); *H01M 2004/021* (2013.01); *Y02E 60/122* (2013.01)

(56) References Cited

U.S. PATENT DOCUMENTS

| | | | |
|---|---|---|---|
| 2006/0105239 A1* | 5/2006 | Paulsen et al. | 429/231.3 |
| 2009/0029253 A1* | 1/2009 | Itou et al. | 429/223 |
| 2009/0220862 A1* | 9/2009 | Toyama et al. | 429/224 |
| 2009/0239150 A1* | 9/2009 | Okada | H01M 4/131 429/231.3 |
| 2010/0209771 A1* | 8/2010 | Shizuka et al. | 429/207 |
| 2010/0310938 A1* | 12/2010 | Okada | H01M 4/131 429/223 |

* cited by examiner

POSITIVE ELECTRODE ACTIVE MATERIAL PRECURSOR FOR LITHIUM SECONDARY BATTERY, POSITIVE ELECTRODE ACTIVE MATERIAL MANUFACTURED BY USING THEREOF, AND LITHIUM SECONDARY BATTERY INCLUDING SAME

CROSS-REFERENCE TO RELATED APPLICATIONS

This application is a 371 of PCT/KR2013/005084 filed on Jun. 10, 2013, which claims the priority of Korean Application Serial. No. 10-2012-0061836 filed on Jun. 8, 2012, Korean Application Serial No. 10-2012-0115047 filed on Oct. 16, 2012 and Korean Application Serial No. 10-2013-0065711 filed on Jun. 10, 2013, the contents of each of which are incorporated herein by reference.

FIELD OF THE INVENTION

The present disclosure relates to a positive electrode active material precursor for a lithium secondary battery, a positive electrode active material manufactured by using thereof, and a lithium secondary battery comprising the same. More specifically, it relates to a positive electrode active material precursor for a lithium secondary battery as a secondary particle, lithium composite oxide, comprising a plurality of transition metals and formed by gathering of a plurality of primary particles having different a-axis direction length to c-axis direction length ratio, wherein the a-axis direction length to c-axis direction length ratio of the primary particle making up the secondary particle is increased from the center to the surface of the secondary particle; a positive electrode active material; and a lithium secondary battery comprising the same.

BACKGROUND OF THE INVENTION

Recently, according to the rapid progress of miniaturization, weight reduction and high-performance of electronics, electronic equipments and communication devices, improvement of performance of a secondary battery, which is used as a power supply of the product, is greatly required. A secondary battery satisfying these requirements may be a lithium secondary battery, and the lithium secondary battery may be largely classified into a lithium sulfur battery using a sulfur-based material as a positive electrode active material and a lithium ion battery using a lithiated transition metal oxide as a positive electrode active material.

The positive electrode active material is a material playing the most importance role to the battery performance and safety of the lithium secondary battery, and it may be a chalcogenide compound. For example, composite metal oxides such as $LiCoO_2$, $LiMn_2O_4$, $LiNiO_2$, $LiNi_{1-x}Co_xO_2$ ($0<x<1$) and $LiMnO_2$ are being studied. This positive electrode active material is mixed to a conducting material such as carbon black, a binder and a solvent to prepare a positive electrode active material slurry composition, and then the composition is coated on a thin metal plate such as aluminum foil to be used as a positive electrode of a lithium ion secondary battery.

Among the positive electrode active materials, the Mn-based positive electrode active material such as $LiMn_2O_4$ and $LiMnO_2$ is attractive material because it is easy to synthesize, cheap and environment-friendly, but it has a shortcoming of small capacity. The Co-based positive electrode active material such as $LiCoO_2$ shows good electric conductivity, high battery voltage and excellent electrode characteristics, but it has a shortcoming of expensive price.

In order to overcome the shortcomings of the Co-based positive electrode active material such as $LiCoO_2$, in recent, researches for developing high capacity batteries are in progress actively. Further, compared with a mobile field such as mobile phone, personal computer, a power tool field such as power tool and a power-driven field such as electric motor motorcycle and electric motor assistance bicycle have large load fluctuation to a power supply, and also used for a long time continuously. Accordingly, high output and high capacity power supplies are demanded.

In general, in a battery, high capacity and high output are contradictory performances, and are difficult to be compatible. For example, a non-aqueous electrolyte battery such as a lithium ion secondary battery as a representative high capacity-type secondary battery can be continuously discharged for a long time due to low load of about 0.2 C. Accordingly, it is mainly used as a power supply for a mobile field and the like, but current density per electrode area at low load is only 0.01 $A/cm^2$. For this reason, the high capacity-type non-aqueous electrolyte battery is not suitable for a power supply for high load used in a power-driven field requiring discharge at high current where current density is 0.1 $A/cm^2$ and more such as power-driven motorcycle and power-driven assistance bicycle.

Further, in the said power field, pulse discharge characteristic of high current becomes important due to frequent on/off of the power supply, but enough pulse discharge capacity cannot be obtained by the high capacity-type non-aqueous electrolyte battery used in the mobile field and the like. On the other hand, high current discharge is possible by a high output-type power supply capacitor and the like, but long-term continuous discharge is difficult due to very small capacity.

SUMMARY OF THE INVENTION

In order to solve the above-described problems, the present invention is objected to provide a positive electrode active material precursor for a lithium secondary battery, which has a novel structure exerting high capacity by controlling shape of a primary particle making up a secondary particle and concentration gradient of metal ions in the primary particle, and a positive electrode active material manufactured by using thereof.

Further, the present invention is objected to provide a lithium secondary battery comprising the positive electrode active material for a lithium secondary battery.

In order to accomplish one object of the present invention, a positive electrode active material precursor for a lithium secondary battery, which is a secondary particle comprising a plurality of transition metals, formed by gathering a plurality of primary particles having different a-axis direction length to c-axis direction length ratio, and having average particle diameter of the range from 4 to 20 µm, wherein the a-axis direction length to c-axis direction length ratio of the primary particle making up the secondary particle is increased from the center to the surface of the secondary particle.

In the positive electrode active material precursor for a lithium secondary battery of the present invention, at least one metal making up the primary particle may show continuous concentration gradient in the primary particle.

In the positive electrode active material precursor for a lithium secondary battery of the present invention, the a-axis orientation of the primary particle may be headed to the center of the secondary particle, and the particles may be adjoining each other and grow to a fixed route. In the positive electrode active material precursor for a lithium secondary battery of the present invention, contact resistance in the particle may be significantly reduced because the primary particles are continuously arranged while headed to the center as described above, and also, output may be improved and high capacity characteristic may be obtained in accordance with that insertion of lithium ions becomes easier.

In the positive electrode active material precursor for a lithium secondary battery of the present invention, the a-axis direction length of the primary particle may be in the range of 0.01 to 0.95 of the secondary particle radius.

In the positive electrode active material precursor for a lithium secondary battery of the present invention, the primary particle may be in the form of rectangular parallelepiped, cube, elliptical ball or inclined rectangular parallelepiped.

In the positive electrode active material precursor for a lithium secondary battery of the present invention, the secondary particle may comprise a first interior, wherein the a-axis direction length to c-axis direction length ratio of the primary particle is constant; and a second interior, wherein the a-axis direction length to c-axis direction length ratio of the primary particle is increasing.

In the positive electrode active material precursor for a lithium secondary battery of the present invention, the a-axis direction length to c-axis direction length ratio of the primary particle of the first interior may be 0.5 to 2.0, and the a-axis direction length to c-axis direction length ratio of the primary particle of the second interior may be 2 to 30.

In the positive electrode active material precursor for a lithium secondary battery of the present invention, at least one metal making up the primary particle of the second interior may have continuous concentration in the primary particle.

In the positive electrode active material precursor for a lithium secondary battery of the present invention, the continuous concentration gradient slopes of the metal showing continuous concentration gradient in the primary particle may be two or more.

In the positive electrode active material precursor for a lithium secondary battery of the present invention, the secondary particle may further comprise a surface maintaining layer, where the metal concentration is constant, on the outside.

Further, the present invention provides a positive electrode active material for a lithium secondary battery, which is a secondary particle comprising a plurality of transition metals, formed by gathering of a plurality of primary particles having different a-axis direction length to c-axis direction length ratio, and having average particle diameter of the range from 4 to 20 μm, wherein the a-axis direction length to c-axis direction length ratio of the primary particle making up the secondary particle is increased from the center to the surface of the secondary particle.

In the positive electrode active material for a lithium secondary battery of the present invention, at least one metal ion making up the primary particle may show continuous concentration gradient in the primary particle.

In the positive electrode active material for a lithium secondary battery of the present invention, the concentration gradient slopes of the metal showing concentration gradient in the primary particle may be two or more.

In the positive electrode active material for a lithium secondary battery of the present invention, the a-axis orientation of the primary particle may be headed to the center of the positive electrode active material as a secondary particle, and the particles may be adjoining each other and grow to a fixed route. In the positive electrode active material for a lithium secondary battery of the present invention, contact resistance in the particle may be significantly reduced because the primary particles are continuously arranged while headed to the center as described above, and also, output may be improved and high capacity characteristic may be obtained in accordance with that insertion of lithium ions becomes easier.

In the positive electrode active material for a lithium secondary battery of the present invention, oxidation numbers, +2 and +3, of Ni may be mixed from the particle surface to the part having radius 0.1 to 0.7 time of the particle radius.

In the positive electrode active material for a lithium secondary battery of the present invention, the primary particle may be in the form of rectangular parallelepiped, cube, elliptical ball or inclined rectangular parallelepiped.

In the positive electrode active material for a lithium secondary battery of the present invention, the a-axis direction length of the primary particle may be in the range of 0.01 to 0.95 of the positive electrode active material radius.

The positive electrode active material for a lithium secondary battery of the present invention may comprises a first interior, wherein the a-axis direction length to c-axis direction length ratio of the primary particle is constant; and a second interior, wherein the a-axis direction length to c-axis direction length ratio of the primary particle is increasing.

In the positive electrode active material for a lithium secondary battery of the present invention, the a-axis direction length to c-axis direction length ratio of the primary particle of the first interior may be 0.8 to 1.2, and the a-axis direction length to c-axis direction length ratio of the primary particle of the second interior is 3 to 12.

In the positive electrode active material for a lithium secondary battery of the present invention, the first interior of the positive electrode active material for a lithium secondary battery may be expressed by an empirical formula of $Li_\delta[Ni_{1-(a+b+c)}Co_aMn_bM_c]O_2$ ($1.0 \leq \delta \leq 1.2$, $0.00 \leq a \leq 0.40$, $0.00 \leq b \leq 0.35$, $0.00 \leq c \leq 0.05$, $0.05 \leq a+b+c \leq 0.5$), and the secondary interior of the secondary particle may be expressed by an empirical formula of $Li_\delta[Ni_{1-(x+y+z)}Co_xMn_yM_z]O_2$ ($1.0 \leq \delta \leq 1.2$, $0.07 \leq x \leq 0.3$, $0.2 \leq y \leq 0.5$, $0.00 \leq z \leq 0.1$, $0.3 \leq x+y+z \leq 0.7$), wherein M is at least one selected from the group consisting elements Al, Mg, Fe, Cr, V, Ti, Mo, Sc, Ce and La.

In the positive electrode active material for a lithium secondary battery of the present invention, in the first interior of the secondary particle, the metal ion concentration may be constant, and, in the second interior, at least one metal making up the primary particle of the second interior may have continuous concentration gradient in the primary particle.

In the positive electrode active material for a lithium secondary battery of the present invention, the positive electrode active material may show concentration gradient of at least one metal making up the secondary particle from the center to the surface of the secondary particle. Namely, the positive electrode active material for a lithium secondary battery of the present invention is characterized that metals show concentration gradient also in the primary particle itself, and metal concentration is gradually changed in the primary particle, and thereby metals may show concentration gradient from the center to the surface of the positive electrode active material in the positive electrode active material as a secondary particle, which is formed by gathering of the primary particles.

In the present invention, there is no limit on the form that metals show the concentration gradient in the positive electrode active material. Namely, the concentrations of all metal may show concentration gradient in the entire positive electrode active material; in the entire positive electrode active material, concentrations of some transition metal may be constant while concentrations of other transition metals may show concentration gradient; or in some part of the positive electrode active material, Ni concentration may be constant while Co and Mn may show concentration gradient, and in the part connected thereto, Co concentration may be constant while Ni and Mn may show concentration gradient.

In the positive electrode active material for a lithium secondary battery of the present invention, the positive electrode active material may further comprise a surface maintaining layer, where the concentrations of metal ions are constant. Namely, stability and electrochemical characteristic of a structure itself may be improved by further forming a surface maintaining layer, where the concentrations of all transition metal making up the positive electrode active material are constant, on the outside of the particle.

The present invention further provides a lithium secondary battery comprising the positive electrode active material according to the present invention.

Advantageous Effects of the Invention

In the positive electrode active material precursor for a lithium secondary battery of the present invention and a positive electrode active material manufactured by using thereof, the a-axis direction length to c-axis direction length ratio is changed primary particle from the center to the surface in the interior of the secondary particle, and the a-axis orientation of the primary particle is headed to the center of the positive electrode active material as a secondary particle, and the particles are adjoining each other and grow to a fixed route. Accordingly, it has effects that insertion and secession of a lithium ion may become easier, and high capacity can be obtained by reduced electric resistance between particles.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Hereinafter, the present invention now will be described in detail with reference to the accompanying drawings.

Figure 1:
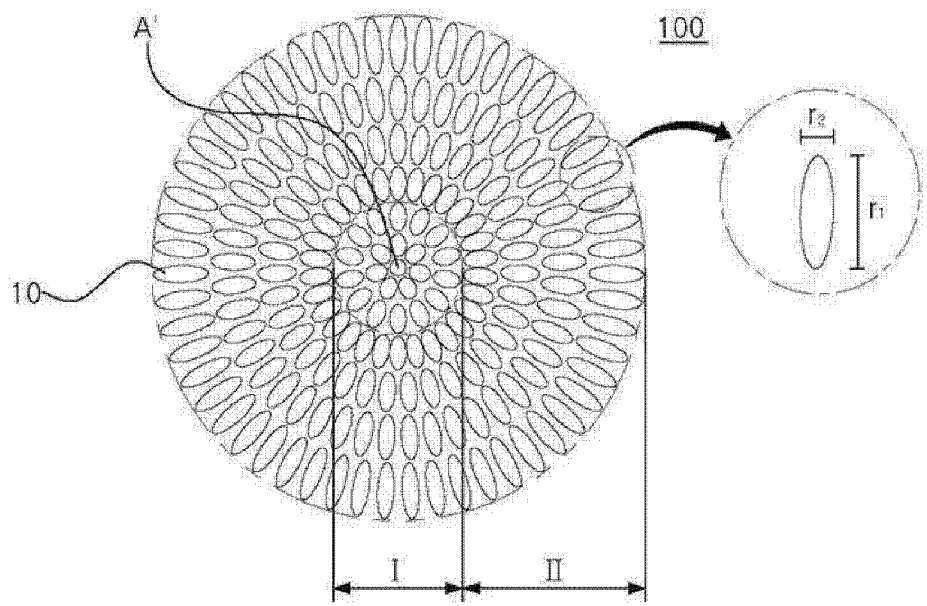
FIG. 1: an internal structure of the positive electrode active material for a lithium secondary battery according to the present invention.

FIG. 1 is an internal cross-sectional image of the positive electrode active material for a lithium secondary battery according to the present invention.

As shown in FIG. 1, the positive electrode active material for a lithium secondary battery 100 according to the present invention is a secondary particle formed by gathering a plurality of primary particles 10 as a small crystal, and it is characterized that the a-axis direction length to c-axis direction length ratio of the primary particle is increased toward a direction from A, a central point, to A', i.e., from the center to the surface of the secondary particle.

Figure 2:
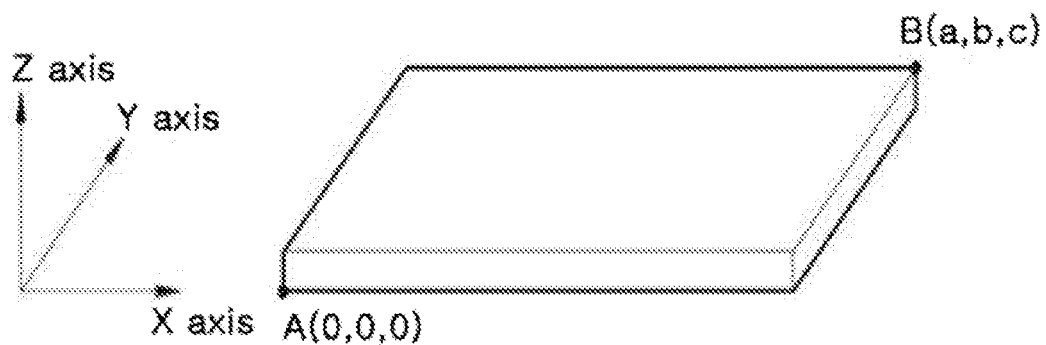
FIG. 2: a method for expressing the structure of the positive electrode active material for a lithium secondary battery according to the present invention.

FIG. 2 is a drawing schematically describing that the primary particle of the positive electrode active material for a lithium secondary battery has the coordinates B(a, b, c) when locating the primary particle of the positive electrode active material for a lithium secondary battery according to the present invention to the origin A(0, 0, 0) of the three-dimensional coordinates having x-axis, y-axis and z-axis. Accordingly, the "a", "b" and "c" are judged to be corresponded to length, width and height of an imaginary cube illustrated in FIG. 2.

In one embodiment of the present invention, the secondary particle is made up of the first interior, shown as I in FIG. 1, where the a-axis direction length to c-axis direction length ratio is constant; and the second interior, shown as II in FIG. 1, where the a-axis direction length to c-axis direction length ratio is increasing. In one embodiment of the present invention, the second interior is characterized that the a-axis orientation of the primary particle is headed to the center of the positive electrode active material as a secondary particle, and the particles are adjoining each other and grow to a fixed route.

Figure 3:
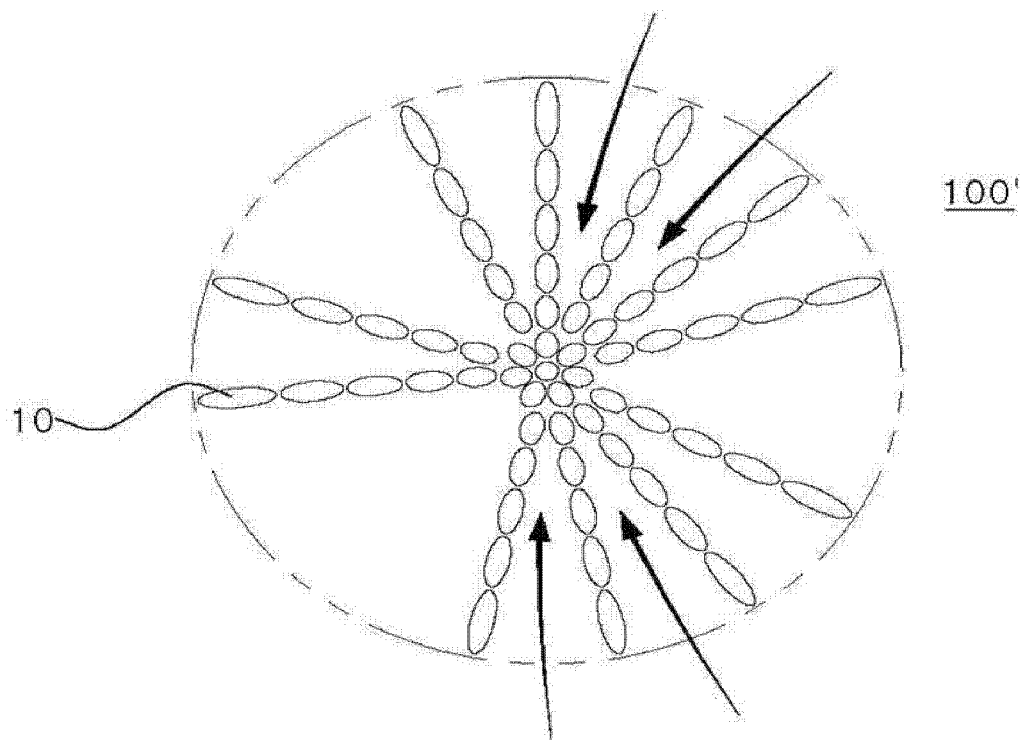
FIG. 3: a TEM image of the positive electrode active material for a lithium secondary battery manufactured by one Example of the present invention.

FIG. 3 is another cross-sectional image of the positive electrode active material for a lithium secondary battery 100' according to the present invention. As shown in FIG. 3, in one embodiment of the present invention, the positive electrode active material for a lithium secondary battery 100 is characterized that the a-axis orientation of the primary particle 10 is headed to the center of the active material as a secondary particle, and the primary particles are adjoining each other and grow to a fixed route. In the positive electrode active material for a lithium secondary battery according to the present invention, wherein the a-axis orientation of the primary particle is headed to the center and the adjoined particles grow to a fixed route as described above, an electrolyte solution is delivered to the inside of the positive electrode active material for a lithium secondary battery 100', and a lithium ion can be easily inserted to the space formed between the fixed routes, and thereby the battery output may be improved, electric energy generated inside of the particle can be effectively delivered due to reduced contact resistance between the particles. As a result, high capacity can be displayed.

In one embodiment of the present invention, the primary particle of the first interior is characterized that the a-axis direction length to c-axis direction length ratio of the primary particle of the first interior may be 0.5 to 2.0, and the a-axis direction length to c-axis direction length ratio of the primary particle of the second interior may be 2 to 30.

Namely, the positive electrode active material for a lithium secondary battery 100 according to one embodiment of the present invention is characterized that primary particles of relatively circular type having width and length of 0.8 to 1.2 are formed in the interior, and primary particles having increased aspect ratio as going to the surface are agglutinated. In the present invention, the a-axis direction length to c-axis direction length ratio is highly increased in the second interior, compared with the first interior.

In one embodiment of the present invention, it is characterized that the a-axis direction length of the primary particle is in the range of 0.01 to 0.95 of the secondary particle radius. In the present invention, the primary particles are adjoined each other and grow to a fixed route, but in the range thereof, it is preferred that the a-axis direction length of the primary particle is in the range of 0.01 to 0.95 of the secondary particle radius.

In one embodiment of the present invention, it is characterized that the first interior of the secondary particle of the positive electrode active material for a lithium secondary battery is expressed by an empirical formula of $Li_\delta[Ni_{1-(a+b+c)}Co_aMn_bM_c]O_2$ ($1.0 \leq \delta \leq 1.2$, $0.00 \leq a \leq 0.40$, $0.00 \leq b \leq 0.35$, $0.00 \leq c \leq 0.05$, $0.05 \leq a+b+c \leq 0.5$), and the secondary interior of the secondary particle of the positive electrode active material for a lithium secondary battery is expressed by an empirical formula of $Li_\delta[Ni_{1-(x+y+z)}Co_xMn_yM_z]O_2$ ($1.0 \leq \delta \leq 1.2$, $0.07 \leq x \leq 0.3$, $0.2 \leq y \leq 0.5$, $0.00 \leq z \leq 0.1$, $0.3 \leq x+y+z \leq 0.7$), wherein M is at least one selected from the group consisting elements Al, Mg, Fe, Cr, V, Ti, Mo, Sc, Ce and La. Namely, in one embodiment of the present invention, the positive electrode active material for a lithium secondary battery is characterized by high Ni content in the first interior, and low Ni content and high Mn content in the second interior.

In the positive electrode active material according to the present invention, the secondary particle of the positive electrode active material for a lithium secondary battery is characterized that oxidation numbers, +2 and +3, of Ni are mixed from the particle surface to the part having radius 0.1 to 0.7 time of the particle radius, i.e., at the part where the active material particles are directly contacted to an electrolyte solution. In accordance with mixing the oxidation numbers of Ni, higher oxidation number than the average oxidation number of Ni used in the existing positive electrode active material is maintained, and electric charge also becomes higher as the oxidation number of Ni becomes higher, thereby Coulomb force between the transition metal atom and oxygen is also increased. Accordingly, a stable binding structure and higher binding force between the transition metal atom and oxygen can be obtained.

In one embodiment of the present invention, it is characterized that at least one metal making up the primary particle of the positive electrode active material for a lithium secondary battery shows continuous concentration gradient in the primary particle, and particularly, at least one metal making up the primary particle existing in the second interior of the secondary particle shows continuous concentration gradient in the primary particle itself.

In the present invention, the positive electrode active material for a lithium secondary battery grows while also showing continuous concentration gradient inside of the primary particle. Further, the a-axis orientation of the primary particle is headed to the center of the positive electrode active material as a secondary particle, and the particles are adjoining each other and grow to a fixed route.

EXAMPLE

Hereinafter, Examples and Comparative Example will be described. The Examples are presented for illustrative purposes only, and do not limit the present invention.

Example 1

Manufacture of Precursor and Active Material Having Constant Mn Concentration in Entire Particle and Showing Concentration Gradients of Ni and Co in Entire Particle Distilled water 4 liter was poured into a coprecipitation reactor (Volume: 4 L, Power of a rotary motor: 80 W or more), and then nitrogen gas was supplied into the reactor at the rate of 0.5 liter/min to remove dissolved oxygen followed by stirring at 1000 rpm while keeping the reactor temperature at 50° C.

In order to make the Mn concentration in the entire particle constant as 0.25 and concentration gradients of Co and Ni transition metal ions, first of all, 2.4 M metal aqueous solution, wherein nickel sulfate, cobalt sulfate and manganese sulfate are mixed at the molar ratio of 75:0:25 was continuously put into the reactor at the rate of 0.3 liter/hour, and 4.8 mol ammonia solution was continuously put into the reactor at the rate of 0.03 liter/hour. Further, for adjusting pH, 4.8 mol sodium hydroxide solution was supplied thereto to keep pH at 11. Impeller speed was controlled to 1000 rpm. Average retention time of the resulting solution in the reactor became about 6 hours by controlling flow rate. After fixing the volume of the metal aqueous solution of nickel sulfate, cobalt sulfate and manganese sulfate, which was supplied, to 4 L at the time when the particle size of the composite metal hydroxide became 2-5 μm, concentration was changed until the molar ratio of nickel sulfate, cobalt sulfate and manganese sulfate of the metal aqueous solution became from 75:0:25 to 55:20:25, and the reaction was continued with the changing metal aqueous solution. The metal composite hydroxide was filtered and washed with water followed by drying in a 110° C. hot air dryer for 15 hours, thereby a metal composite hydroxide as a positive electrode active material precursor was manufactured.

The metal composite hydroxide manufactured as described above and lithium hydroxide (LiOH) were mixed at the molar ratio of 1:1.07, heated at the rate of 2° C./min, and then kept at 500° C. for 10 hours for conducting pre-calcination. Then, the resulting material was calcined at 780° C. for 20 hours to obtain positive electrode active material powder of Example 1-1, wherein the first interior was constant as $Li[Ni_{0.75}Mn_{0.25}]O_2$, and in the second interior, the Mn concentration was maintained as 0.25 from $Li[Ni_{0.75}Mn_{0.25}]O_2$ to $Li[Ni_{0.55}Co_{0.20}Mn_{0.25}]O_2$, and Ni and Co have continuous constant concentration gradient in the entire particle, and average concentration in the particle was expressed by $Li(Ni_{0.60}Co_{0.15}Mn_{0.25})O_2$.

The procedure of Example 1-1 was repeated except for continuing the reaction as maintaining the said molar ratio when the molar ratio of the metal aqueous solution reached 55:20:25 during the particle forming process for further comprising a surface maintaining sections having thickness of 0.2 μm, 0.5 μm and 1.0 μm, respectively, so as to obtain spherical nickel-manganese-cobalt composite hydroxides of Examples 1-2 to 1-4 containing the second interior having concentration gradient and a surface maintaining section.

Comparative Example 1

Particles having constant metal ion concentration expressed by $Li(Ni_{0.60}Co_{0.15}Mn_{0.25})O_2$ in the entire particle were manufactured.

Test Example

TEM Imaging

Approximate centers of the precursors and the active material particles manufactured in Example 1-1, Example 1-3 and Example 1-4, and the powder manufactured in Comparative Example 1 were cut with a hydrogen ion beam, and samples for measurement were prepared. Then, TEM images of each sample were taken, and the results were shown in FIGS. 4 to 8.

Figure 4:
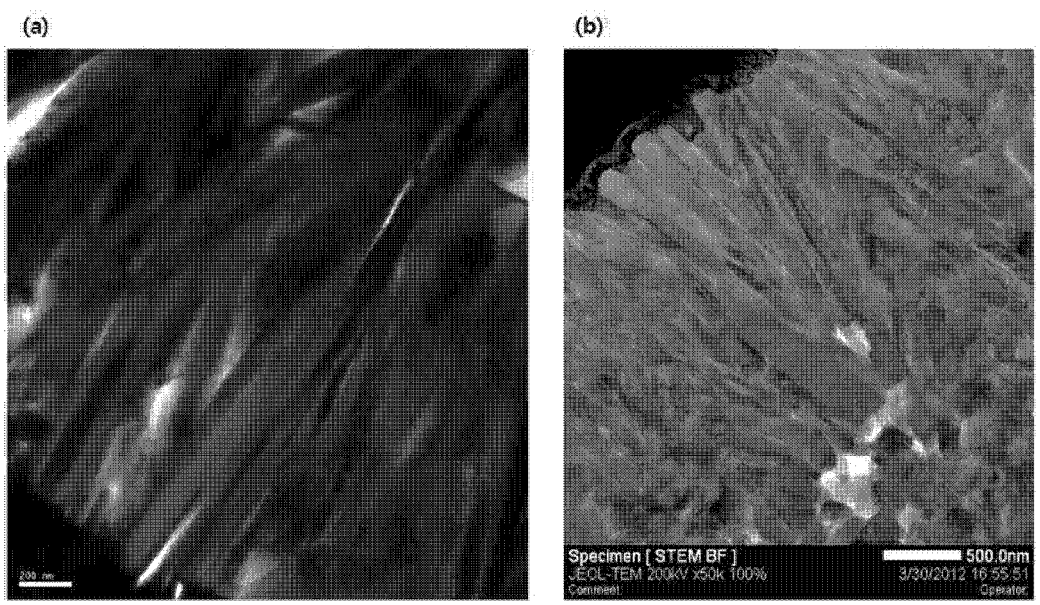
FIG. 4: a TEM image of the cross-section of the positive electrode active material precursor and the positive electrode active material powder, which are manufactured in one Example of the present invention and have concentration gradient.
Figure 5:
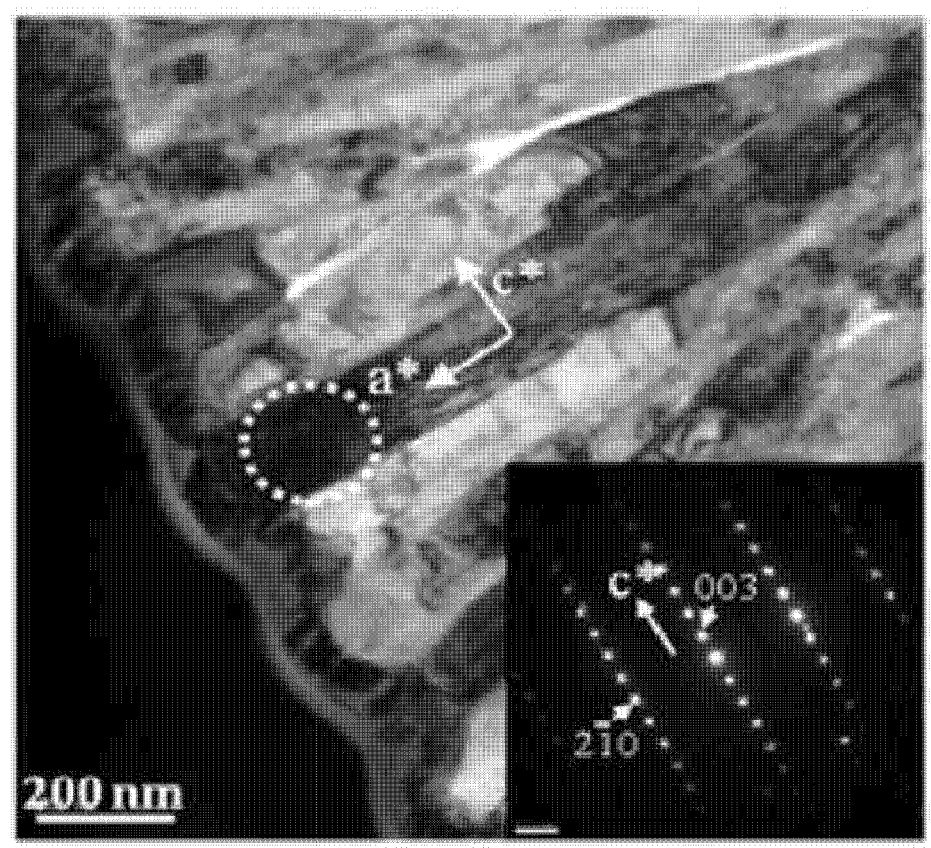
FIG. 5: an image indicating an a-axis and a c-axis in a positive electrode active material powder.

FIG. 4 is a TEM image of the cross-section of the precursor (a) and the positive electrode active material powder (b), which were manufactured according to Example 1-1 and have concentration gradient in the entire particle, and FIG. 5 is an image indicating an a-axis and a c-axis in the positive electrode active material powder manufactured according to Example 1-1. As shown in FIG. 4 and FIG. 5, it was confirmed that, in the primary particles of the positive electrode active material powder and the precursor, which were manufactured according to Example 1-1 and had concentration gradient in the entire particle, the a-axis direction length to c-axis direction length ratio was increased from the center to the surface of the secondary particle, and the primary particles were arranged side by side toward the center of the particle.

Figure 6:
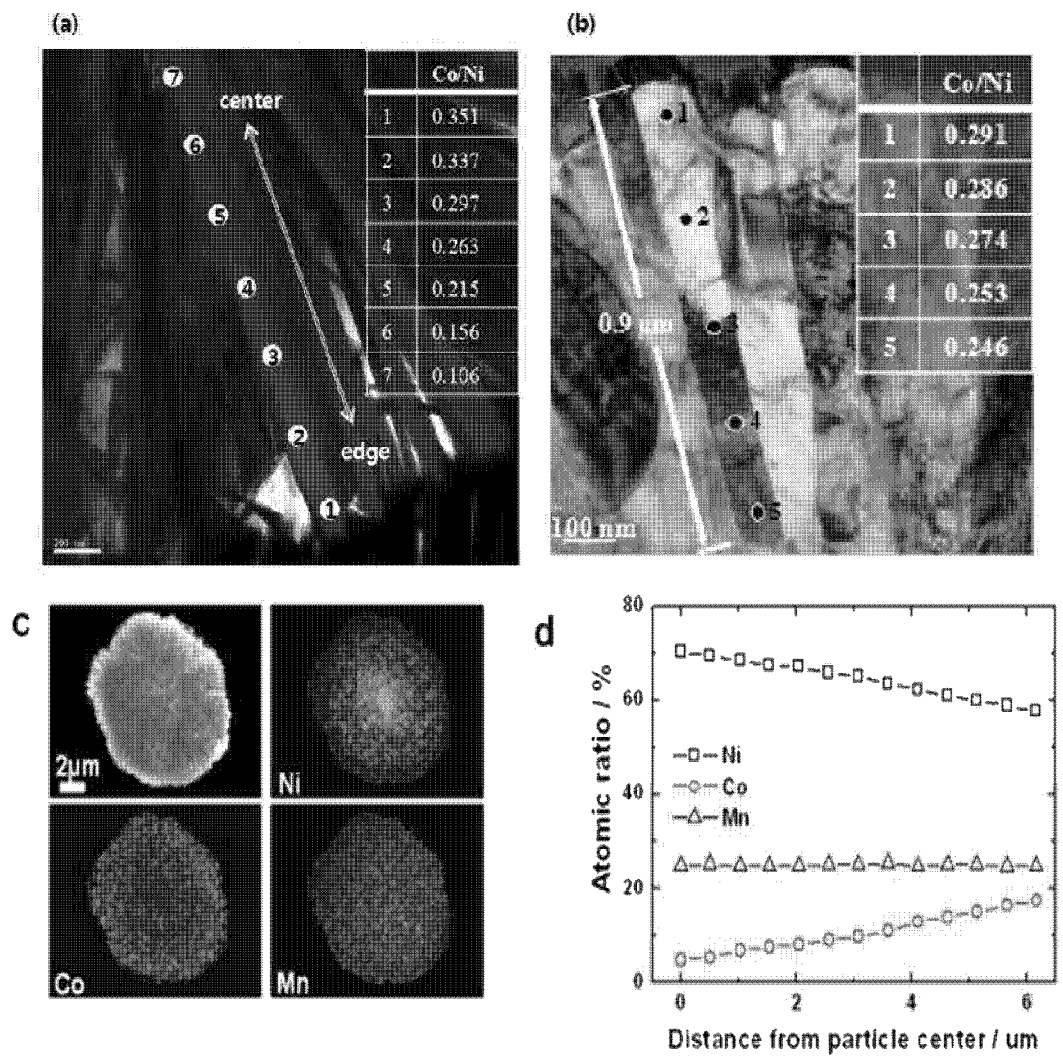
FIG. 6: a result of measuring Co/Ni ratio in the primary particle of the positive electrode active material precursor and the positive electrode active material powder manufactured in one Example of the present invention.

FIG. 6 represents the result of measuring Co/Ni ratios in the primary particle of the precursor (a) and the positive electrode active material (b) manufactured according to Example 1-1. In FIG. 6, it was confirmed that the Co/Ni ratios in the primary particle of the precursor and the positive electrode active material were gradually changed, and as a result, the Co/Ni ratio at the surface part was higher than the Co/Ni ratio at the center part.

Figure 7:
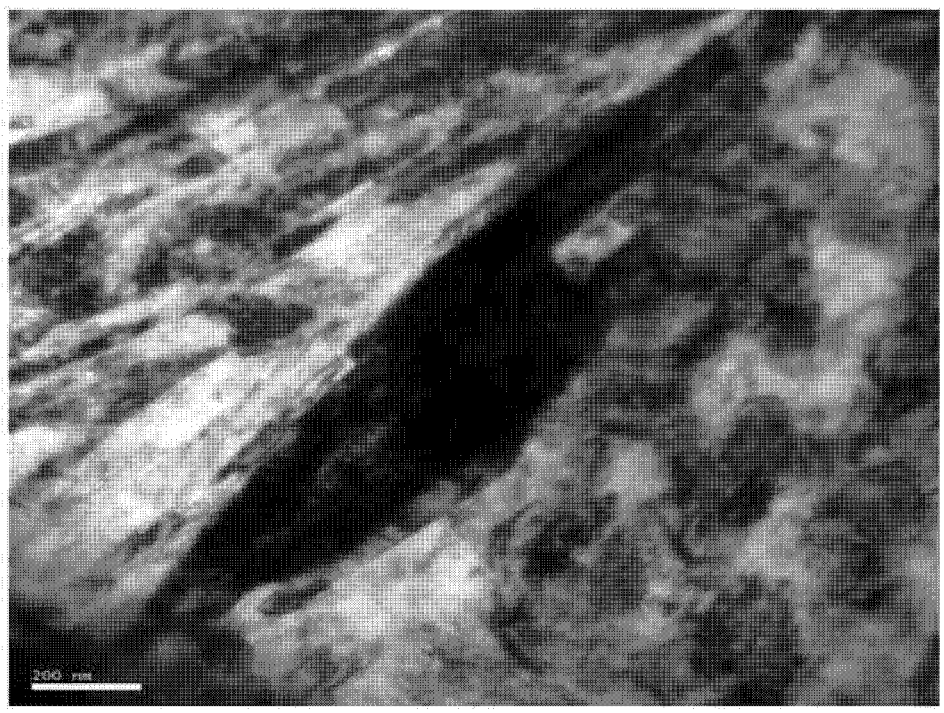
FIG. 7 and FIG. 8: TEM images of the positive electrode active material for a lithium secondary battery manufactured in one Example of the present invention.
Figure 8:

FIGS. 7 and 8 are TEM images measuring the cross sections of the active materials manufactured in Examples 1-3 and 1-4, which had a surface maintaining section having thickness of 0.5 μm and 1.0 μm, respectively. In FIG. 7 and FIG. 8, it was confirmed that the primary particles had orientation toward the center even when the surface maintaining section was formed, and the a-axis direction length to c-axis direction length ratio was increasing.

Figure 9:
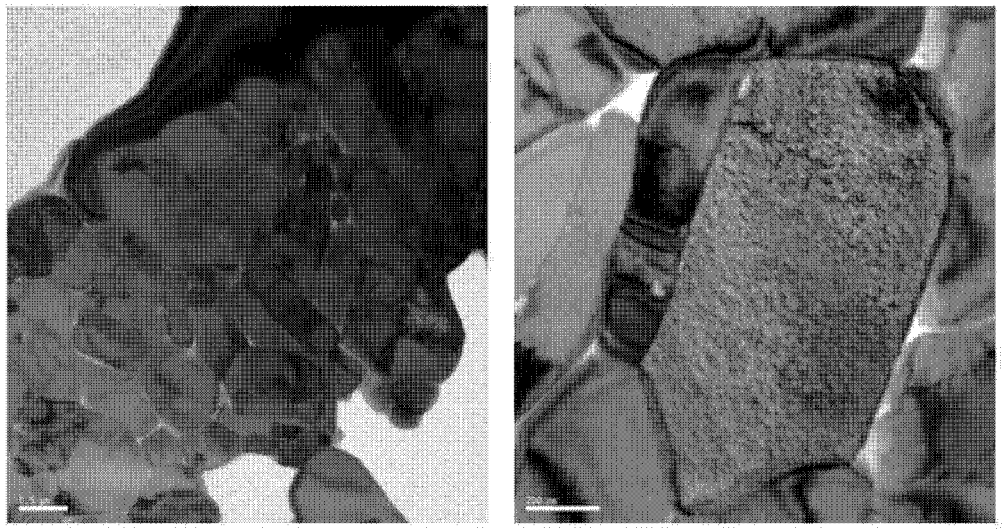
FIG. 9: a TEM image of the positive electrode active material for a lithium secondary battery manufactured in one Comparative Example of the present invention.

FIG. 9 represents a TEM image of the cross-section of the positive electrode active material, which was manufactured in Comparative Example 1 and had constant metal concentration of $Li(Ni_{0.60}Co_{0.15}Mn_{0.25})O_2$ in the entire particle. It was confirmed that the average particle concentration was identical with that of Example 1 as $Li(Ni_{0.60}Co_{0.15}Mn_{0.25})O_2$, but unlike the positive electrode active material having concentration gradient in the entire particle, the a-axis direction length to c-axis direction length ratio was constant and there was no orientation toward the center of the particle.

Test Example

Measuring Battery Characteristic

Batteries were manufactured by using the active material particle powders manufactured in Examples 1-1 to 1-4, and then capacity, life time characteristic and DSC characteristic were measured. The results were shown in the following Table 1.

As shown in the following Table 1, it was confirmed that the batteries using Examples 1-1 to 1-4 having concentration gradient showed improved capacity, life time characteristic and DSC characteristic, compared with the battery using Comparative Example not showing concentration gradient, and in particular, the life time characteristic and the DSC characteristic were improved as the thickness of the surface maintaining section was increased.

TABLE 1

|  | Capacity (mAhg$^{-1}$) | Life Time Characteristic (%, 100$^{th}$) | DSC (° C.) |
| --- | --- | --- | --- |
| Example 1-1 | 193.0 | 94.5 | 277.3 |
| Example 1-2 | 191.1 | 95.2 | 280.1 |
| Example 1-3 | 188.2 | 96.1 | 287.2 |
| Example 1-4 | 184.8 | 97.3 | 294.7 |
| Comparative Example 1 | 181.3 | 93.9 | 266.3 |

Example 2

Manufacture of Precursor and Active Material Having Constant Mn Concentration in Entire Particle and Showing Concentration Gradients of Ni and Co in Entire Particle In order to make the Mn concentration in the entire particle constant as 0.3 and concentration gradients of Co and Ni, first of all, 2.4 M metal aqueous solution, wherein nickel sulfate, cobalt sulfate and manganese sulfate are mixed at the molar ratio of 70:0:30, was used, and then the procedure of Example 1 was repeated except for continuing the reaction by using the metal aqueous solution whose concentration was changing until the concentration became 50:20:30 to obtain a precursor and an active material of Example 2-1.

The procedure of Example 2-1 was repeated except for continuing the reaction as maintaining the said molar ratio when the molar ratio of the metal aqueous solution reached 50:20:30 during the composite particle forming process for further comprising a surface maintaining sections having thickness of 0.5 μm, so as to obtain a precursor and an active material of Example 2-2.

Test Example

TEM Imaging

Approximate center of the active material particle powder manufactured in Example 2-2 was cut with a hydrogen ion beam, and a sample for measurement was prepared. Then, TEM images were taken.

Figure 10:
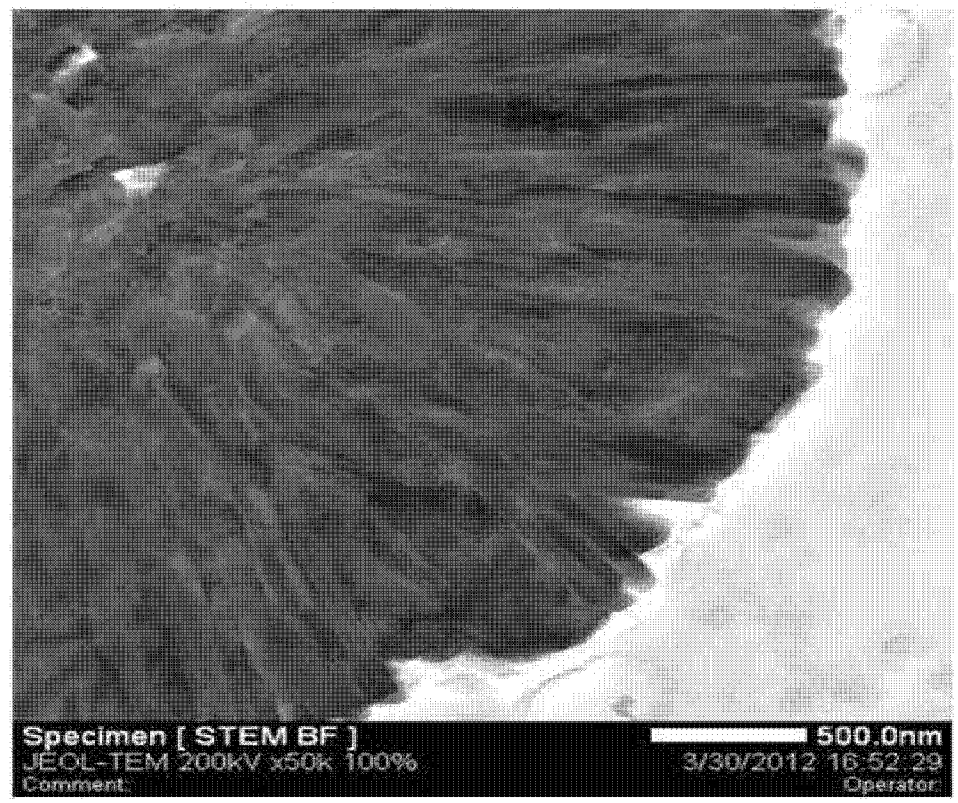
FIG. 10: a TEM image of the positive electrode active material for a lithium secondary battery manufactured in one Example of the present invention.

FIG. 10 represents a TEM image of the cross-section of the positive electrode active material powder manufactured according to Example 2-2. It was confirmed that the primary particles had orientation toward the center even when the Mn concentration was constant as 0.3, the concentrations of Co and Ni showed gradient, and a surface maintaining section was formed, and the a-axis direction length to c-axis direction length ratio was increasing.

Test Example

Measuring Battery Characteristic

Batteries were manufactured by using the active material particle powders manufactured in Examples 2-1 to 2-2, and then capacity, life time characteristic and DSC characteristic were measured. The results were shown in the following Table 2.

As shown in the following Table 2, it was confirmed that the batteries using Examples 2-1 to 2-2 showed improved capacity, life time characteristic and DSC characteristic, and in particular, the life time characteristic and the DSC characteristic were improved as the thickness of the surface maintaining section was increased.

TABLE 2

|  | Capacity (mAhg$^{-1}$) | Life Time Characteristic (%, 100$^{th}$) | DSC (° C.) |
| --- | --- | --- | --- |
| Example 2-1 | 183.9 | 96.2 | 291.8 |
| Example 2-2 | 182.3 | 97.0 | 295.3 |

Example 3

Manufacture of Precursor and Active Material Having Constant Co Concentration in Entire Particle and Showing Concentration Gradients of Ni and Mn in Entire Particle In order to make the Co concentration in the entire particle constant as 0.1 and concentration gradients of Ni and Mn, first of all, 2.4 M metal aqueous solution, wherein nickel sulfate, cobalt sulfate and manganese sulfate are mixed at the molar ratio of 85:10:05, was used, and then the procedure of Example 1 was repeated except for continuing the reaction by using the metal aqueous solution whose concentration was changing until the concentration became 60:10:30 to obtain a positive electrode active material precursor and a positive electrode active material, thereby obtaining a positive electrode active material powder of Example 3-1.

The procedure of Example 3-1 was repeated except for continuing the reaction as maintaining the said molar ratio when the molar ratio of the metal aqueous solution reached 60:10:30 during the composite particle forming process for further comprising a surface maintaining sections having thickness of 0.2 μm and 0.5 μm, respectively, so as to obtain spherical nickel-manganese-cobalt composite hydroxide precursors of Examples 3-2 and 3-3 containing the second interior having concentration gradient and a surface maintaining section.

Test Example

TEM Imaging

Figure 11:
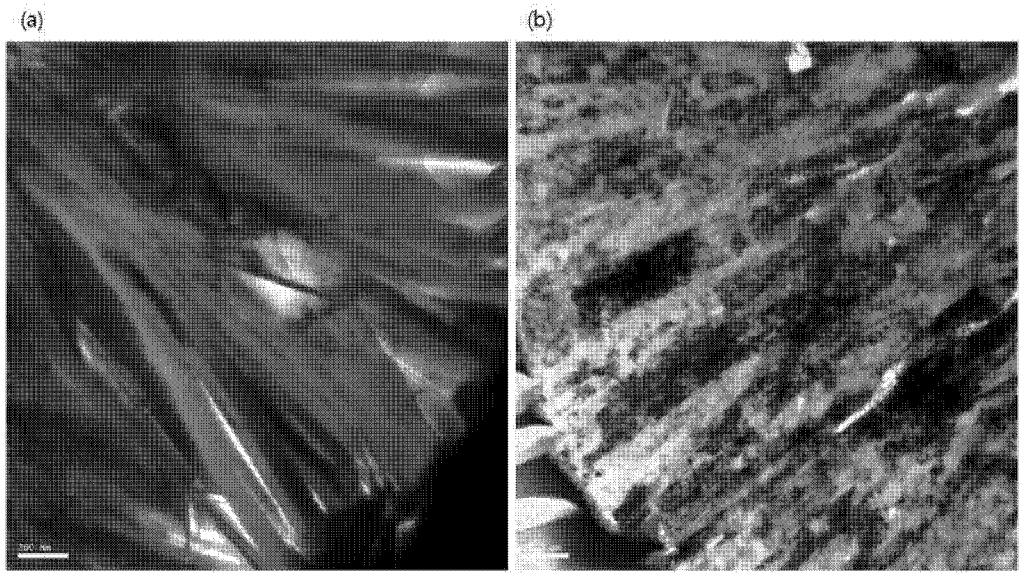
FIG. 11 to FIG. 16: TEM images of cross-sections of the positive electrode active material precursor and the positive electrode active material powder manufactured in one Example of the present invention.
Figure 12:
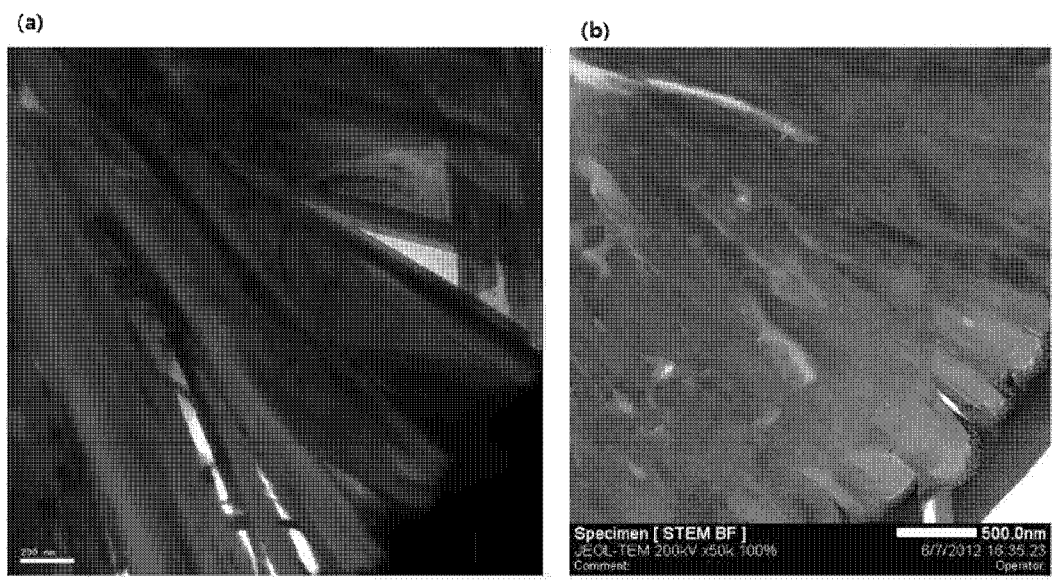

TEM images of the cross-sections of the nickel-manganese-cobalt composite hydroxide precursors and the positive electrode active material of Examples 3-2 to 3-3 were taken, and the results were shown in FIGS. 11 and 12.

FIGS. 11 and 12 represent TEM images of the precursor (a) of Example 3-2 and Example 3-3 and the positive electrode active material (b). It was confirmed that when the thickness of the surface maintaining section were 0.2 μm and 0.5 μm, respectively, the a-axis direction length to c-axis direction length ratio of the primary particle was increased, and the primary particles grew with the orientation toward the center of the secondary particle in both of the precursor and the active material.

Comparative Example 2

Figure 13:
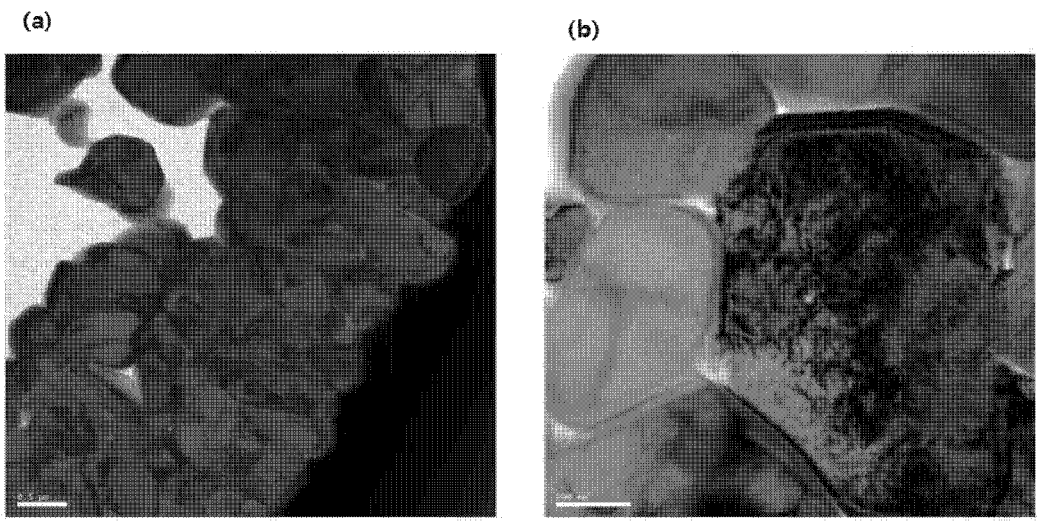

Particles having constant metal ion concentration expressed by $Li(Ni_{0.65}Co_{0.10}Mn_{0.25})O_2$ in the entire particle were manufactured, and the cross-sectional TEM image thereof was shown in FIG. 13. It was confirmed that the particle had constant a-axis direction length to c-axis direction length ratio, and did not show the orientation toward the center of the particle.

Test Example

Measuring Battery Characteristic

Batteries were manufactured by using the active material particle powders manufactured in Examples 3-1 to 3-3, and then capacity, life time characteristic and DSC characteristic were measured. The results were shown in the following Table 3.

As shown in the following Table 3, it was confirmed that the batteries using Examples 3-1 to 3-3 having concentration gradient showed improved capacity, life time characteristic and DSC characteristic, compared with the battery using Comparative Example 2 not showing concentration gradient, and in particular, the life time characteristic and the DSC characteristic were improved as the thickness of the surface maintaining section was increased.

TABLE 3

|  | Capacity (mAhg$^{-1}$) | Life Time Characteristic (%, 100$^{th}$) | DSC (° C.) |
| --- | --- | --- | --- |
| Example 3-1 | 197.1 | 94.5 | 270.3 |
| Example 3-2 | 196.0 | 95.2 | 273.5 |
| Example 3-3 | 194.8 | 96.1 | 278.1 |
| Comparative Example 2 | 185.8 | 91.8 | 261.2 |

Example 4

Manufacture of Precursor and Active Material Having Constant Ni Concentration in Entire Particle and Showing Concentration Gradients of Co and Mn in Entire Particle In order to make the Ni concentration in the entire particle constant as 0.8 and concentration gradients of Co and Mn, first of all, nickel sulfate, cobalt sulfate and manganese sulfate were mixed at the molar ratio of 80:20:00, and then the procedure of Example 1 was repeated except for continuing the reaction by using the metal aqueous solution whose concentration was changing until the concentration became 80:01:19 to obtain a positive electrode active material powder of Example 4-1, wherein the first interior had concentration of Li[Ni$_{0.80}$Co$_{0.20}$]O$_2$ and the second interior had constant continuous concentration gradient from Li[Ni$_{0.80}$Co$_{0.20}$]O$_2$ to Li[Ni$_{0.80}$Co$_{0.01}$Mn$_{0.19}$]O$_2$.

The procedure of Example 4 was repeated except for continuing the reaction as maintaining the said molar ratio when the molar ratio of the metal aqueous solution reached 80:01:19 during the composite particle forming process for further comprising a surface maintaining sections having thickness of 0.2 μm and 0.5 μm, respectively, so as to obtain spherical nickel-manganese-cobalt composite hydroxides of Examples 4-2 and 4-3 containing the second interior having concentration gradient and a surface maintaining section.

Test Example

TEM Imaging

Figure 14:
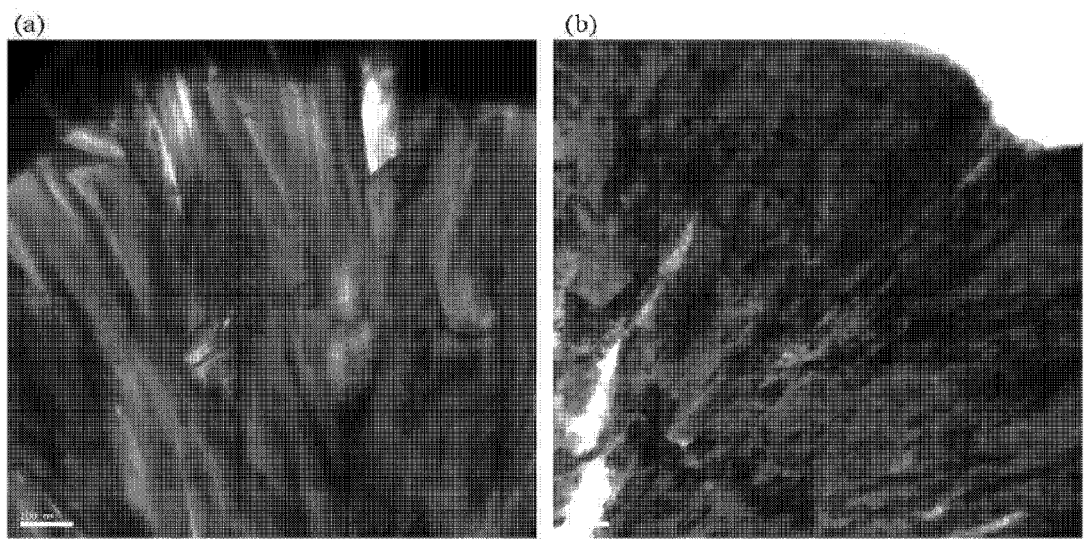

TEM images of the cross-sections of the nickel-manganese-cobalt composite hydroxide precursor and the positive electrode active material of Example 4-3 were taken, and the results were shown in FIG. 14.

FIG. 14 represents a TEM image of the precursor (a) and the positive electrode active material (b) of Example 4-3. It was confirmed that the a-axis direction length to c-axis direction length ratio of the primary particle was increased, and the primary particles grew with the orientation toward the center of the particle in both of the precursor and the active material, wherein the Ni concentration was constant as 0.8, the Co and Mn concentrations showed gradient, and a surface maintaining section was contained thereto.

Comparative Example 3

Particles having constant metal ion concentration expressed by Li(Ni$_{0.65}$Co$_{0.10}$Mn$_{0.25}$)O$_2$ in the entire particle were manufactured.

Example 5

Manufacture of Precursor and Active Material Having Constant Ni Concentration in Entire Particle and Showing Concentration Gradients of Co and Mn in Entire Particle In order to make the Ni concentration in the entire particle constant as 0.75 and concentration gradients of Co and Mn as Example 5-1, first of all, nickel sulfate, cobalt sulfate and manganese sulfate were mixed at the molar ratio of 75:25:00, and then the procedure of Example 1 was repeated except for continuing the reaction by using the metal aqueous solution whose concentration was changing until the concentration became 75:02:23 to obtain a positive electrode active material powder, wherein the first interior had concentration of Li[Ni$_{0.75}$Co$_{0.25}$]O$_2$ and the second interior had constant continuous concentration gradient from Li[Ni$_{0.75}$Co$_{0.25}$]O$_2$ to Li[Ni$_{0.75}$Co$_{0.02}$Mn$_{0.23}$]O$_2$.

The procedure of Example 4 was repeated except for continuing the reaction as maintaining the said molar ratio when the molar ratio of the metal aqueous solution reached 75:02:23 during the composite particle forming process for further comprising a surface maintaining sections having thickness of 0.2 μm and 0.5 μm, respectively, so as to obtain spherical nickel-manganese-cobalt composite hydroxides of Examples 5-2 and 5-3 containing the second interior having concentration gradient and a surface maintaining section.

Example 6

Manufacture of Precursor and Active Material Having Constant Ni Concentration in Entire Particle and Showing Concentration Gradients of Co and Mn in Entire Particle In order to make the Ni concentration in the entire particle constant as 0.70 and concentration gradients of Co and Mn as Example 6, first of all, nickel sulfate, cobalt sulfate and manganese sulfate were mixed at the molar ratio of 70:30:00, and then the procedure of Example 1 was repeated except for continuing the reaction by using the metal aqueous solution whose concentration was changing until the concentration became 70:02:28 to obtain a positive electrode active material powder, wherein the first interior had concentration of Li[Ni$_{0.70}$Co$_{0.30}$]O$_2$ and the second interior had constant continuous concentration gradient up to Li[Ni$_{0.70}$Co$_{0.02}$Mn$_{0.28}$]O$_2$.

The procedure of Example 4 was repeated except for continuing the reaction as maintaining the said molar ratio when the molar ratio of the metal aqueous solution reached 70:02:28 during the composite particle forming process for further comprising a surface maintaining sections having thickness of 0.2 μm and 0.5 μm, respectively, so as to obtain spherical nickel-manganese-cobalt composite hydroxides of Examples 6-2 and 6-3 containing the second interior having concentration gradient and a surface maintaining section.

Example 7

Manufacture of Precursor and Active Material Having Constant Ni Concentration in Entire Particle and Showing Concentration Gradients of Co and Mn in Entire Particle In order to make the Ni concentration in the entire particle constant as 0.65 and concentration gradients of Co and Mn as Example 7, first of all, nickel sulfate, cobalt sulfate and manganese sulfate were mixed at the molar ratio of 65:35:00, and then the procedure of Example 1 was repeated except for continuing the reaction by using the metal aqueous solution whose concentration was changing until the concentration became 65:02:33 to obtain a positive electrode active material powder, wherein the first interior had concentration of Li[Ni$_{0.65}$Co$_{0.35}$]O$_2$ and the second interior had constant continuous concentration gradient up to Li[Ni$_{0.65}$Co$_{0.02}$Mn$_{0.33}$]O$_2$.

The procedure of Example 4 was repeated except for continuing the reaction as maintaining the said molar ratio when the molar ratio of the metal aqueous solution reached 65:02:33 during the composite particle forming process for further comprising a surface maintaining sections having thickness of 0.2 μm and 0.5 μm, respectively, so as to obtain spherical nickel-manganese-cobalt composite hydroxides of Examples 7-2 and 7-3 containing the second interior having concentration gradient and a surface maintaining section.

Comparative Example 4

Particles having constant metal ion concentration expressed by Li(Ni$_{0.62}$Co$_{0.15}$Mn$_{0.23}$)O$_2$ in the entire particle were manufactured.

Test Example

Measuring Battery Characteristic

Batteries were manufactured by using the active material particle powders, which were manufactured in Examples 4 to 7 and had constant Ni concentration and concentration gradients of Co and Mn in the entire particle, and then capacity, life time characteristic and DSC characteristic were measured. The results were shown in the following Table 4.

As shown in the following Table 4, it was confirmed that the batteries using Examples 4 to 7 having concentration gradient showed improved capacity, life time characteristic and DSC characteristic, compared with the battery using Comparative Example 4 not showing concentration gradient, and in particular, the life time characteristic and the DSC characteristic were improved as the thickness of the surface maintaining section was increased.

TABLE 4

|  | Capacity (mAhg$^{-1}$) | Life Time Characteristic (%, 100$^{th}$) | DSC (° C.) |
| --- | --- | --- | --- |
| Example 4 | 211.3 | 86.1 | 244.7 |
| Example 4-2 | 210.8 | 86.8 | 245.5 |
| Example 4-3 | 209.7 | 87.2 | 247.1 |
| Example 5 | 205.6 | 91.0 | 256.5 |
| Example 5-2 | 204.7 | 91.7 | 258.8 |
| Example 5-3 | 203.9 | 92.5 | 260.1 |
| Example 6 | 200.8 | 92.9 | 266.9 |
| Example 6-2 | 199.8 | 93.5 | 268.2 |
| Example 6-3 | 198.5 | 94.2 | 270.0 |
| Example 7 | 195.7 | 94.3 | 275.1 |
| Example 7-2 | 195.2 | 94.9 | 275.9 |
| Example 7-3 | 194.5 | 95.7 | 277.2 |
| Comparative Example 4 | 200.9 | 53.2 | 229.9 |

Example 8

Manufacture of Precursor and Active Material Having Constant Ni Concentration in Entire Particle and Showing Concentration Gradients of Co and Mn in Entire Particle In order to make the Ni concentration in the entire particle constant as 0.9 and concentration gradients of Co and Mn as Example 8, first of all, nickel sulfate, cobalt sulfate and manganese sulfate were mixed at the molar ratio of 90:10:00, and then the procedure of Example 1 was repeated except for continuing the reaction by using the metal aqueous solution whose concentration was changing until the concentration became 90:01:09 to obtain a positive electrode active material powder, wherein the first interior had concentration of Li[Ni$_{0.90}$Co$_{0.10}$]O$_2$ and the second interior had constant continuous concentration gradient up to Li[Ni$_{0.90}$Co$_{0.01}$Mn$_{0.09}$]O$_2$.

Example 9

Manufacture of Precursor and Active Material Having Constant Ni Concentration in Entire Particle and Showing Concentration Gradients of Co and Mn in Entire Particle In order to make the Ni concentration in the entire particle constant as 0.6 and concentration gradients of Co and Mn as Example 9, first of all, nickel sulfate, cobalt sulfate and manganese sulfate were mixed at the molar ratio of 60:40:00, and then the procedure of Example 1 was repeated except for continuing the reaction by using the metal aqueous solution whose concentration was changing until the concentration became 60:02:38 to obtain a positive electrode active material powder of Example 9-1, wherein the first interior had concentration of Li[Ni$_{0.60}$Co$_{0.40}$]O$_2$ and the second interior had constant continuous concentration gradient up to Li[Ni$_{0.60}$Co$_{0.02}$Mn$_{0.38}$]O$_2$.

Further, first of all, nickel sulfate, cobalt sulfate and manganese sulfate were mixed at the molar ratio of 60:20:20, and then the procedure of Example 1 was repeated except for continuing the reaction by using the metal aqueous solution whose concentration was changing until the concentration became 60:02:38 to obtain a positive electrode active material powder of Example 9-2, wherein the first interior had concentration of Li[Ni$_{0.60}$Co$_{0.20}$Mn$_{0.20}$]O$_2$ and the second interior had constant continuous concentration gradient up to Li[Ni$_{0.60}$Co$_{0.02}$Mn$_{0.38}$]O$_2$.

Example 10

Manufacture of Precursor and Active Material Having Constant Ni Concentration in Entire Particle and Showing Concentration Gradients of Co and Mn in Entire Particle In order to make the Ni concentration in the entire particle constant as 0.5 and concentration gradients of Co and Mn as Example 10, first of all, nickel sulfate, cobalt sulfate and manganese sulfate were mixed at the molar ratio of 50:50:00, and then the procedure of Example 1 was repeated except for continuing the reaction by using the metal aqueous solution whose concentration was changing until the concentration became 50:20:30 to obtain a positive electrode active material powder of Example 10-1, wherein the first interior had concentration of Li[Ni$_{0.50}$Co$_{0.50}$]O$_2$ and the second interior had constant continuous concentration gradient up to Li[Ni$_{0.50}$Co$_{0.2}$Mn$_{0.3}$]O$_2$.

Further, first of all, nickel sulfate, cobalt sulfate and manganese sulfate were mixed at the molar ratio of 50:30:20, and then the procedure of Example 1 was repeated except for continuing the reaction by using the metal aqueous solution whose concentration was changing until the concentration became 50:20:30 to obtain a positive electrode active material powder of Example 10-2, wherein the first interior had concentration of Li[Ni$_{0.50}$Co$_{0.30}$Mn$_{0.20}$]O$_2$ and the second interior had constant continuous concentration gradient up to Li[Ni$_{0.50}$Co$_{0.20}$Mn$_{0.30}$]O$_2$.

Further, first of all, nickel sulfate, cobalt sulfate and manganese sulfate were mixed at the molar ratio of 50:20:30, and then the procedure of Example 1 was repeated except for continuing the reaction by using the metal aqueous solution whose concentration was changing until the concentration became 50:05:45 to obtain a positive electrode active material powder of Example 10-3, wherein the first interior had concentration of Li[Ni$_{0.50}$Co$_{0.20}$Mn$_{0.30}$]O$_2$ and the second interior had constant continuous concentration gradient up to Li[Ni$_{0.50}$Co$_{0.05}$Mn$_{0.45}$]O$_2$.

Test Example

Measuring Battery Characteristic

Batteries were manufactured by using the active material particle powders, which were manufactured in Examples 8 to 10 and had constant Ni concentration and concentration gradients of Co and Mn in the entire particle, and then capacity, life time characteristic and DSC characteristic were measured. The results were shown in the following Table 5.

As shown in the following Table 5, it was confirmed that the batteries using the active material particle powders manufactured in Examples 8 to 10 having concentration gradient showed improved life time characteristic and DSC characteristic.

TABLE 5

| | Capacity (mAhg$^{-1}$) | Life Time Characteristic (%, 100$^{th}$) | DSC (° C.) | Tap density |
|---|---|---|---|---|
| Example 8 | 215.4 | 87.6 | 241.2 | 2.39 |
| Example 9 | 189.8 | 93.6 | 279.2 | 2.48 |
| Example 9-2 | 188.2 | 94.8 | 282.2 | 2.53 |
| Example 10 | 184.2 | 95.1 | 291.2 | 2.49 |
| Example 10-2 | 182.7 | 95.9 | 295.1 | 2.51 |
| Example 10-3 | 178.5 | 93.2 | 302.5 | 2.58 |

Example 11

Case of Showing Concentration Gradients of Co, Ni and Mn in Entire Particle

In order to make the concentration gradients of Co, Ni and Mn, first of all, nickel sulfate, cobalt sulfate and manganese sulfate were mixed at the molar ratio of 80:05:15, and then the procedure of Example 1 was repeated except for using the metal aqueous solution whose concentration was changing until the molar ratio became as shown in the following Table to obtain positive electrode active material powders having constant continuous concentration gradients of Co, Ni and Mn.

TABLE 6

| | Ni:Co:Mn |
|---|---|
| Example 11-1 | 55:15:30 |
| Example 11-2 | 55:20:25 |
| Example 11-3 | 60:15:25 |
| Example 11-4 | 60:10:30 |

Figure 15:
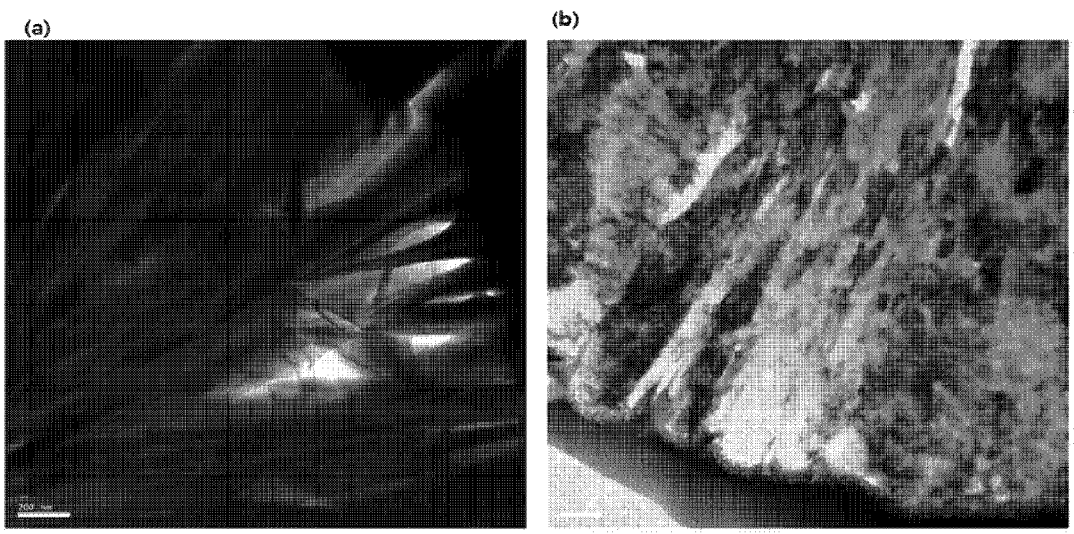

Samples of the nickel-manganese-cobalt composite hydroxide and the positive electrode active material manufactured in Example 11-4 were manufactured, and then TEM images were taken. The result was shown in FIG. 15.

Comparative Example 5

Particles having constant metal ion concentration expressed by Li(Ni$_{0.62}$Co$_{0.13}$Mn$_{0.25}$)O$_2$ in the entire particle were manufactured.

Test Example

Measuring Battery Characteristic

Batteries were manufactured by using the active material particle powders manufactured in Examples 11 to 11-4, and then capacity, life time characteristic and DSC characteristic were measured. The results were shown in the following Table 7.

As shown in the following Table 7, it was confirmed that the batteries using Examples 11 to 11-4 having concentration gradient showed improved capacity, life time characteristic and DSC characteristic, compared with the battery using Comparative Example 5 not showing concentration gradient, and in particular, the life time characteristic and the DSC characteristic were improved as the thickness of the surface maintaining section was increased.

TABLE 7

| | Capacity (mAhg$^{-1}$) | Life Time Characteristic (%, 100$^{th}$) | DSC (° C.) |
|---|---|---|---|
| Example 11 | 191.2 | 94.7 | 275.9 |
| Example 11-2 | 192.8 | 94.2 | 270.7 |
| Example 11-3 | 195.8 | 93.3 | 269.9 |
| Example 11-4 | 196.2 | 94.4 | 272.5 |
| Comparative Example 5 | 183.6 | 92.8 | 264.1 |

Example 12

Case of Showing Concentration Gradients of Co, Ni and Mn in Entire Particle

In order to make the concentration gradients of Co, Ni and Mn, first of all, nickel sulfate, cobalt sulfate and manganese sulfate were mixed as shown in the following Table 8, and then the procedure of Example 1 was repeated except for using the metal aqueous solution whose concentration was changing until the concentration became 55:15:30 to obtain nickel-manganese-cobalt composite hydroxides and positive electrode active material particles having constant continuous concentration gradients of Co, Ni and Mn.

TABLE 8

| | Ni:Co:Mn |
|---|---|
| Example 12-1 | 80:00:20 |
| Example 12-2 | 80:10:10 |
| Example 12-3 | 80:15:05 |
| Example 12-4 | 80:20:00 |

Figure 16:
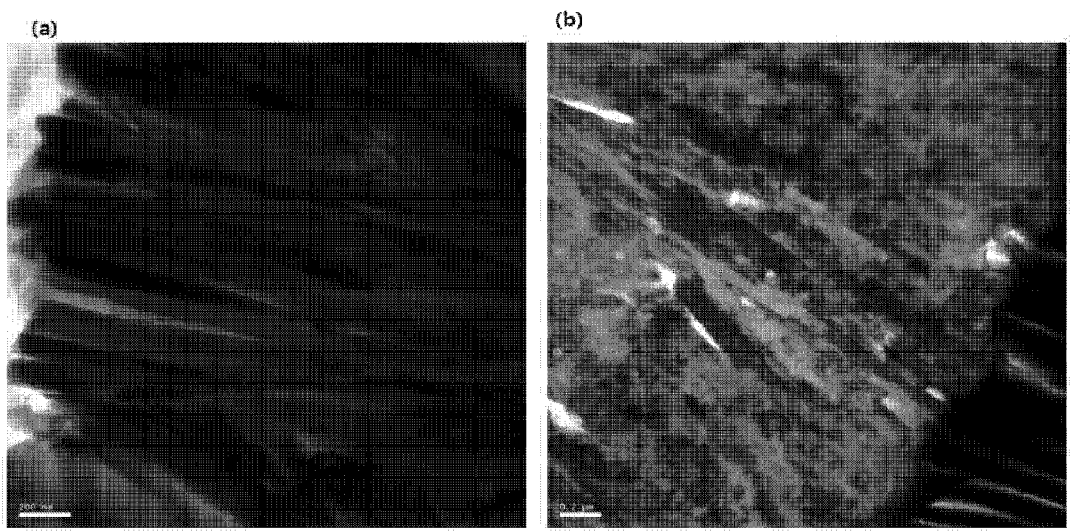

Samples of the nickel-manganese-cobalt composite hydroxide and the positive electrode active material manufactured in Example 12-1 were manufactured, and then TEM images were taken. The result was shown in FIG. 16.

Comparative Example 6

Particles having constant metal ion concentration expressed by Li(Ni$_{0.62}$Co$_{0.15}$Mn$_{0.23}$)O$_2$ in the entire particle were manufactured.

Test Example

Measuring Battery Characteristic

Batteries were manufactured by using the active material particle powders manufactured in Examples 12 to 12-4, and then capacity, life time characteristic and DSC characteristic were measured. The results were shown in the following Table 9.

As shown in the following Table 9, it was confirmed that the batteries using Examples 12-1 to 12-4 having concentration gradient showed improved capacity, life time characteristic and DSC characteristic, compared with the battery using Comparative Example 6 not showing concentration gradient, and in particular, the life time characteristic and the DSC characteristic were improved as the thickness of the surface maintaining section was increased.

TABLE 9

|  | Capacity (mAhg$^{-1}$) | Life Time Characteristic (%, 100$^{th}$) | DSC (° C.) |
|---|---|---|---|
| Example 12-1 | 190.8 | 95.1 | 277.9 |
| Example 12-2 | 191.4 | 95.0 | 274.7 |
| Example 12-3 | 191.5 | 94.7 | 272.9 |
| Example 12-4 | 191.9 | 94.5 | 271.8 |
| Comparative Example 6 | 184.1 | 92.0 | 260.8 |

Example 12

Case of Showing Concentration Gradients of Co, Ni and Mn in Entire Particle

In order to make the outside composition constant as 63:12:25 but concentration gradients of Co, Ni and Mn in the entire particle, first of all, nickel sulfate, cobalt sulfate and manganese sulfate were mixed at the molar ratio shown in the following Table 10, and then the procedure of Example 1 was repeated except for using the metal aqueous solution whose concentration was changing until the concentration became 63:12:25 to obtain positive electrode active material particles, so as to obtain positive electrode active material powder, wherein the concentrations of Co, Ni and Mn showed gradient in the entire particle.

TABLE 10

|  | Ni:CO:Mn |
|---|---|
| Example 13-1 | 75:00:25 |
| Example 13-2 | 80:00:20 |
| Example 13-3 | 85:00:15 |
| Example 13-4 | 75:10:15 |
| Example 13-5 | 80:10:10 |
| Example 13-6 | 85:10:05 |

Figure 17:
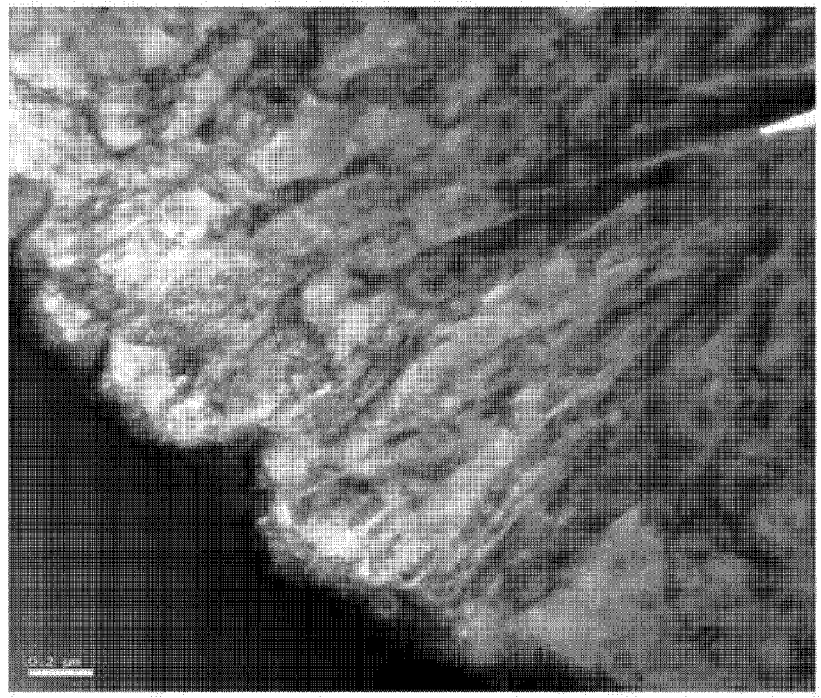
FIG. 17: a TEM image of the positive electrode active material for a lithium secondary battery manufactured in one Example of the present invention.

A sample of the nickel-manganese-cobalt composite hydroxide manufactured in Example 13-6 was manufactured, and then a TEM image was taken. The result was shown in FIG. 17.

Comparative Example 7

Particles having constant metal ion concentration expressed by Li(Ni$_{0.68}$Co$_{0.12}$Mn$_{0.20}$)O$_2$ in the entire particle were manufactured.

Test Example

Measuring Battery Characteristic

Batteries were manufactured by using the active material particle powders manufactured in Examples 13-1 to 13-6, and then capacity, life time characteristic and DSC characteristic were measured. The results were shown in the following Table 11.

As shown in the following Table 11, it was confirmed that the batteries using Examples 13-1 to 13-6 having concentration gradient showed improved capacity, life time characteristic and DSC characteristic, compared with the battery using Comparative Example 7 not showing concentration gradient, and in particular, the life time characteristic and the DSC characteristic were improved as the thickness of the surface maintaining section was increased.

TABLE 11

|  | Capacity (mAhg$^{-1}$) | Life Time Characteristic (%, 100$^{th}$) | DSC (° C.) |
|---|---|---|---|
| Example 13-1 | 196.9 | 94.6 | 271.2 |
| Example 13-2 | 197.5 | 94.0 | 269.9 |
| Example 13-3 | 198.2 | 93.2 | 267.4 |
| Example 13-4 | 197.1 | 94.2 | 270.0 |
| Example 13-5 | 198.1 | 93.7 | 268.9 |
| Example 13-6 | 198.9 | 92.8 | 266.9 |
| Comparative Example 7 | 188.3 | 90.2 | 257.5 |

Example 14

In order to manufacture a positive electrode active material precursor and a positive electrode active material continuously comprising the first interior, wherein the Co composition was constant, and the Ni and Mn compositions showed concentration gradient, and the second interior, wherein the Mn composition was constant, and the Co and Ni compositions showed concentration gradient, the procedure of Example 1 was repeated except for using a metal aqueous solution whose concentration was changing until the concentration became 55:20:25 while mixing a mixture of nickel sulfate, cobalt sulfate and manganese sulfate at the composition of 65:10:25 to a mixture of nickel sulfate, cobalt sulfate and manganese sulfate at the composition of 75:10:15 to manufacture a positive electrode active material particle, so as to obtain a positive electrode active material precursor 및 positive electrode active material of Example 14-1, wherein in the first interior, the Co composition was constant, and the Ni and Mn compositions showed concentration gradient, and in the second interior, wherein the Mn composition was constant, and the Co and Ni compositions showed concentration gradient.

The procedure of Example 4 was repeated except for continuing the reaction as maintaining the said molar ratio when the molar ratio of the metal aqueous solution reached 55:20:25 during the particle forming process for further comprising surface maintaining sections having thickness of 0.2 μm and 0.5 μm, respectively, so as to obtain spherical nickel-manganese-cobalt composite hydroxides of Examples 14-2 and 14-3 containing the second interior having concentration gradient and a surface maintaining section.

Test Example

Measuring Battery Characteristic

Batteries were manufactured by using the active material particle powders manufactured in Examples 14-1 to 14-3, and then capacity, life time characteristic and DSC characteristic were measured. The results were shown in the following Table 12.

As shown in the following Table 12, it was confirmed that the batteries using Examples 14-1 to 14-3 having concentration gradient showed improved capacity, life time characteristic and DSC characteristic, compared with the battery using Comparative Example 7 not showing concentration gradient, and in particular, the life time characteristic and the DSC characteristic were improved as the thickness of the surface maintaining section was increased.

TABLE 12

|  | Capacity (mAhg$^{-1}$) | Life Time Characteristic (%, 100$^{th}$) | DSC (° C.) |
| --- | --- | --- | --- |
| Example 14-1 | 193.1 | 94.2 | 275.7 |
| Example 14-2 | 191.0 | 95.0 | 278.8 |
| Example 14-3 | 189.5 | 95.9 | 285.9 |
| Comparative Example 7 | 181.3 | 93.9 | 266.3 |

Example 15

Manufacturing Core-Gradient Shell Precursor and Active Material

A positive electrode active material precursor and a positive electrode active material of Example 15-1, wherein the nickel:manganese:cobalt composition was constant as 90:05:05 in the first interior, and the composition of Co, Ni and Mn showed concentration gradient from 90:05:05 to 0.33:0.33:0.33 in the second interior, were manufactured.

A positive electrode active material precursor and a positive electrode active material of Example 15-2, wherein the composition was constant as 90:05:05 in the first interior, and the composition of Co, Ni and Mn showed concentration gradient from 70:10:20 to 60:10:30 in the second interior, were manufactured.

Test Example

TEM Imaging

Figure 18:
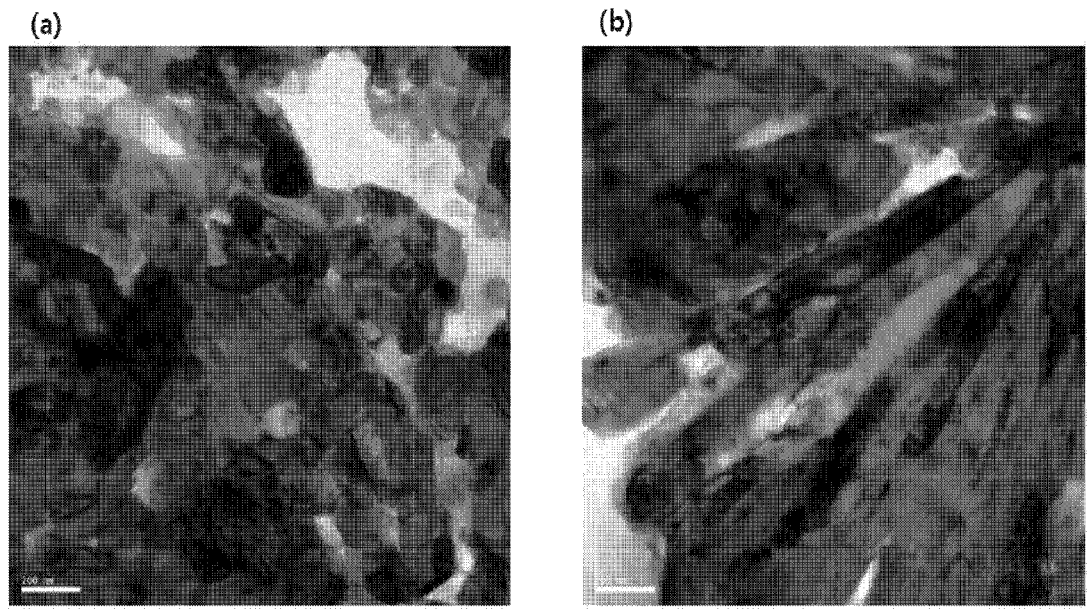
FIG. 18 and FIG. 19: TEM images of the core part and the shell part of the positive electrode active material for a lithium secondary battery.
Figure 19:
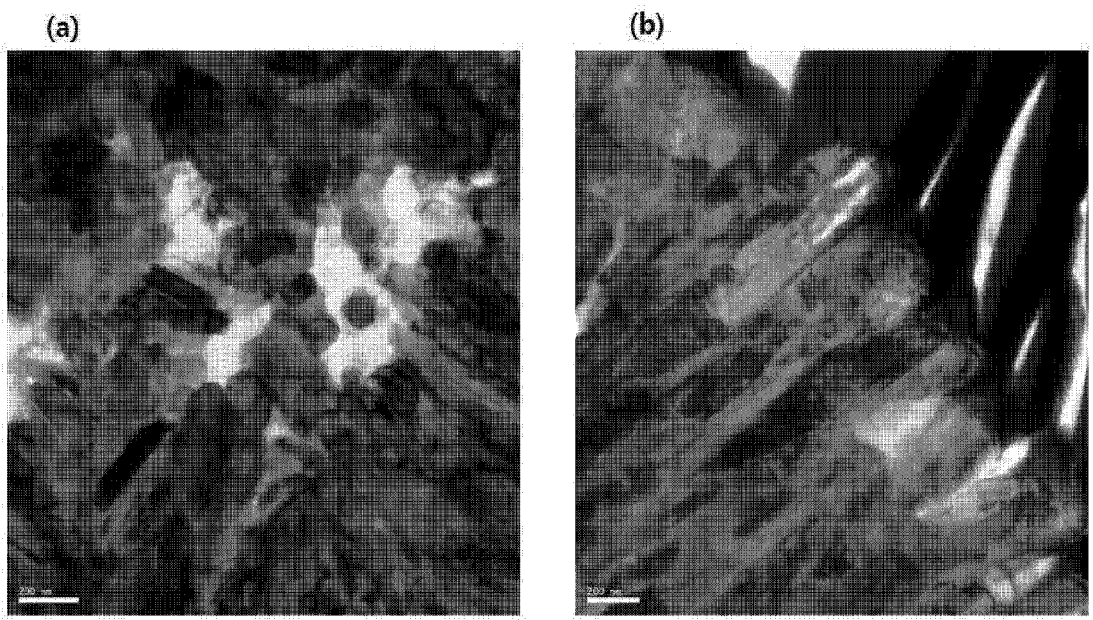

TEM images of the cross-sections of the nickel-manganese-cobalt composite hydroxide precursors and the positive electrode active material of Examples 15-1 and 15-2 were taken, and the results were shown in FIGS. 18 and 19, respectively.

FIGS. 18 and 19 represent TEM images of the core part (a) having constant concentration and the shell part (b) showing concentration gradient. In FIGS. 18 and 19, it was confirmed that the core part having constant concentration was in the form of a circle, but the a-axis direction length to c-axis direction length ratio of the primary particle was increased in the shell part showing concentration gradient.

Example 16

Manufacturing Core-Shell Precursor and Active Material

Positive electrode active material precursors and positive electrode active materials having a core-shell structure, wherein the composition of nickel:manganese:cobalt at the core part and the shell part were as shown in the following Table 13, were manufactured.

TABLE 13

|  | Core Composition | Shell Composition | Shell Thickness |
| --- | --- | --- | --- |
| Example 16-1 | 90:05:05 | 50:20:30 | 0.2 μm |
| Example 16-2 | 80:10:10 | 50:20:30 | 0.2 μm |
| Example 16-3 | 70:10:20 | 50:20:30 | 0.2 μm |
| Example 16-4 | 70:10:20 | 40:20:40 | 0.2 μm |
| Example 16-5 | 60:20:20 | 50:20:30 | 0.2 μm |
| Example 16-6 | 70:10:20 | 50:20:30 | 0.5 μm |
| Example 16-7 | 70:10:20 | 50:20:30 | 1.0 μm |
| Example 16-8 | 70:10:20 | 50:20:30 | 1.5 μm |
| Example 16-9 | 70:10:20 | 50:20:30 | 2.0 μm |
| Example 16-10 | 70:10:20 | 50:20:30 | 2.5 μm |

Batteries were manufactured by using the manufactured active material particle powders, and then capacity, life time characteristic and DSC characteristic were measured. The results were shown in the following Table 14.

TABLE 14

|  | Capacity (mAhg$^{-1}$) | Life Time Characteristic (%, 100$^{th}$) | DSC (° C.) | Tap Density |
| --- | --- | --- | --- | --- |
| Example 16-1 | 191.4 | 92.7 | 269.7 | 2.45 |
| Example 16-2 | 186.7 | 94.1 | 273.2 | 2.44 |
| Example 16-3 | 181.9 | 95.5 | 275.5 | 2.44 |
| Example 16-4 | 182.8 | 94.9 | 272.5 | 2.46 |
| Example 16-5 | 177.9 | 96.5 | 279.8 | 2.45 |
| Example 16-6 | 185.7 | 93.9 | 271.8 | 2.43 |
| Example 16-7 | 181.9 | 95.5 | 275.2 | 2.44 |
| Example 16-8 | 179.4 | 96.0 | 279.8 | 2.44 |
| Example 16-9 | 176.2 | 97.1 | 284.6 | 2.46 |
| Example 16-10 | 172.1 | 97.5 | 288.4 | 2.45 |

Test Example

Measuring X-Ray Photoelectron Spectroscopy

In order to measure oxidation number of the active material particle manufactured in Example 1-1 to the direction of the particle radius, X-ray photoelectron spectroscopy was measured. The result was shown in FIG. 20.

Figure 20:
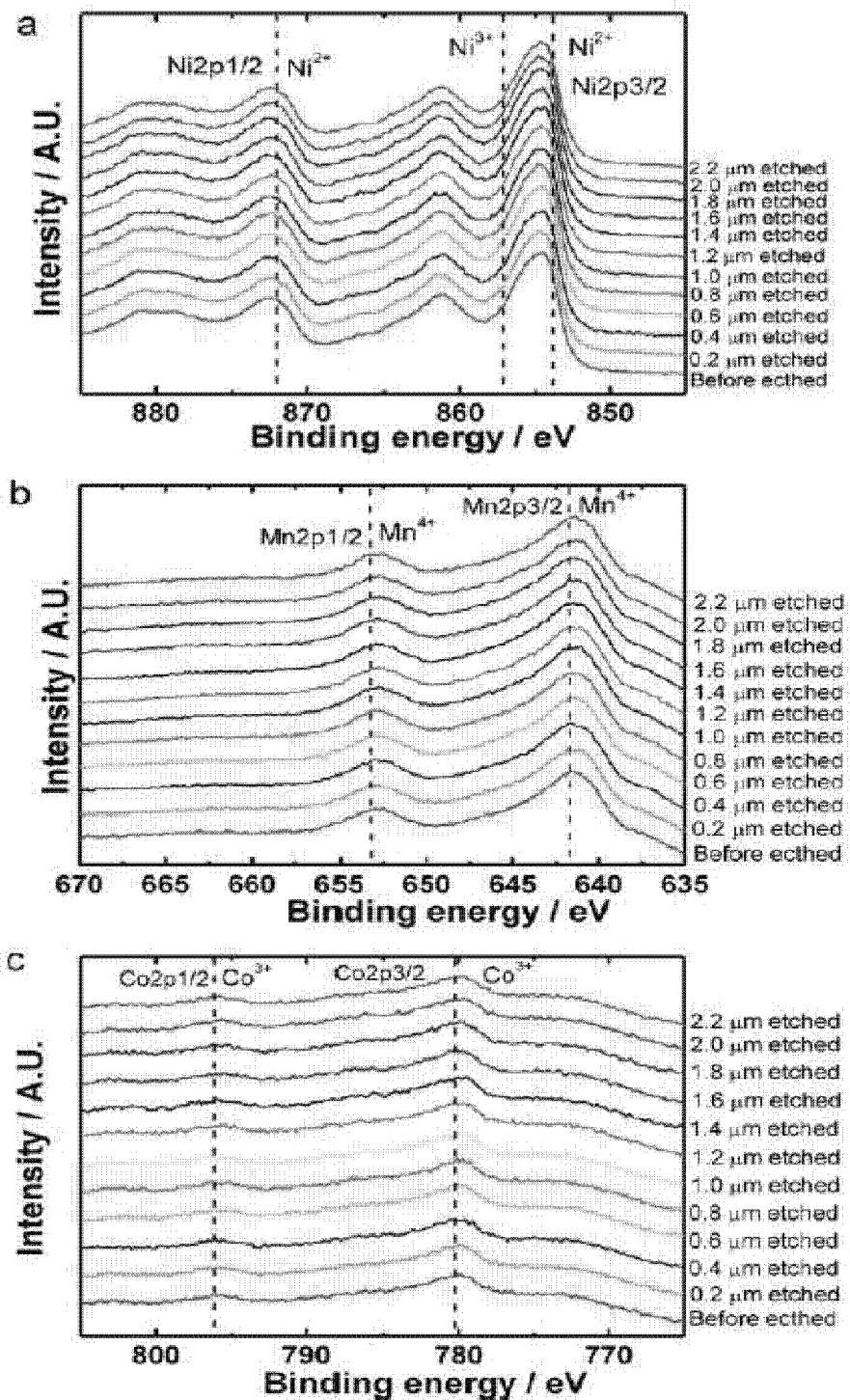
FIG. 20: a result of measuring XPS of the positive electrode active material for a lithium secondary battery manufactured in one Example of the present invention.

As shown in FIG. 20, the active material particle manufactured in Example of the present invention was determined that Ni oxidation number from the surface to the 2 μm depth was +2 or more. Accordingly, it was confirmed that the oxidation numbers +2 and +3 were mixed, and the oxidation numbers of Mn and Co were constant.

INDUSTRIAL APPLICABILITY

In the positive electrode active material precursor for a lithium secondary battery of the present invention and a positive electrode active material manufactured by using thereof, the a-axis direction length to c-axis direction length ratio is changed primary particle from the center to the surface in the interior of the secondary particle, and the a-axis orientation of the primary particle is headed to the center of the positive electrode active material as a secondary particle, and the particles are adjoining each other and grow to a fixed route. Accordingly, it has effects that insertion and secession of a lithium ion may become easier, and high capacity can be obtained by reduced electric resistance between particles.

While the invention has been described with respect to the above specific embodiments, it should be recognized that various modifications and changes may be made and also fall within the scope of the invention as defined by the claims that follow.

What is claimed is:

1. A positive electrode active material precursor for a lithium secondary battery, which is a secondary particle comprising a plurality of transition metals and interior sections,
   wherein the secondary particle is formed by gathering a plurality of primary particles,
   wherein the primary particles have a crystal structure that has an a-axis and c-axis,
   wherein the a-axis direction is a direction from a center to a surface of the secondary particle, and the c-axis direction is perpendicular to the a-axis direction, wherein the a-axis orientation of the primary particle is headed to the center of the secondary particle, and the primary particles are adjoining each other and align with the a-axis direction,
   wherein at least one of the interior sections comprises primary particles having the a-axis direction length to the c-axis direction length ratios different from each other, and the a-axis
   direction length to the c-axis direction length ratios of the primary particles are sequentially increased from a center to a surface of the secondary particle.

2. The positive electrode active material precursor for a lithium secondary battery according to claim 1, wherein at least one metal in the primary particle has continuous concentration gradient in the primary particle.

3. The positive electrode active material precursor for a lithium secondary battery according to claim 1, wherein the a-axis direction length of the primary particle is in the range of 0.01 to 0.95 of a radius of the secondary particle.

4. The positive electrode active material precursor for a lithium secondary battery according to claim 1, wherein the primary particle is in the form of rectangular parallelepiped, cube, elliptical ball or inclined rectangular parallelepiped.

5. The positive electrode active material precursor for a lithium secondary battery according to claim 1, wherein the secondary particle comprises a first interior having the a-axis direction length to c-axis direction length ratios of the primary particles be constant; and a second interior having the a-axis direction length to c-axis direction length ratios of the primary particles be increasing.

6. The positive electrode active material precursor for a lithium secondary battery according to claim 5, wherein the a-axis direction length to c-axis direction length ratio of the primary particle of the first interior is 0.5 to 2.0, and the a-axis direction length to c-axis direction length ratio of the primary particle of the second interior is 2 to 30.

7. The positive electrode active material precursor for a lithium secondary battery according to claim 5, wherein at least one metal in the primary particle of the second interior has continuous concentration distribution in the primary particle.

8. The positive electrode active material precursor for a lithium secondary battery according to claim 7, wherein at least one metal in the primary particle in the second interior has two or more concentration gradient slopes shown in the primary particle.

9. The positive electrode active material precursor for a lithium secondary battery according to claim 1, wherein the secondary particle further comprises a surface maintaining layer, where the metal concentration is constant, on the outside.

10. A positive electrode active material for a lithium secondary battery comprising a compound of lithium metal and the positive electrode active material precursor for a lithium secondary battery according to claim 1.

11. The positive electrode active material for a lithium secondary battery according to claim 10, wherein at least one metal in the primary particle has concentration gradient in the primary particle.

12. The positive electrode active material for a lithium secondary battery according to claim 11, wherein the concentration gradient slopes of the metal having concentration gradient in the primary particle are two or more.

13. The positive electrode active material for a lithium secondary battery according to claim 10, wherein, in the secondary particle, oxidation numbers, +2 and +3, of Ni are mixed from the secondary particle surface to the part having radius 0.1 to 0.7 time of a radius of the secondary particle.

14. The positive electrode active material for a lithium secondary battery according to claim 10, wherein the a-axis direction length of the primary particle is in the range of 0.01 to 0.95 of a radius of the secondary particle.

15. The positive electrode active material for a lithium secondary battery according to claim 10, wherein the secondary particle comprises a first interior, wherein the a-axis direction length to c-axis direction length ratios of the primary particles are constant; and a second interior, wherein the a-axis direction length to c-axis direction length ratios of the primary particles are increasing.

16. The positive electrode active material for a lithium secondary battery according to claim 15, wherein the a-axis direction length to c-axis direction length ratio of the primary particle of the first interior is 0.5 to 2.0, and the a-axis direction length to c-axis direction length ratio of the primary particle of the second interior is 2 to 30.

17. The positive electrode active material for a lithium secondary battery according to claim 15, wherein the first interior of the secondary particle of the positive electrode active material for a lithium secondary battery is expressed by an empirical formula of $Li_\delta[Ni_{1-(a+b+c)}Co_aMn_bM_c]O_2$ ($1.0 \le \delta \le 1.2$, $0.00 \le a \le 0.40$, $0.00 \le b \le 0.35$, $0.00 \le c \le 0.05$, $0.05 \le a+b+c \le 0.5$), and the secondary interior of the secondary particle of the positive electrode active material for a lithium secondary battery is expressed by an empirical formula of $Li_\delta[Ni_{1-(x+y+z)}Co_xMn_yM_z]O_2$ ($1.0 \le \delta \le 1.2$, $0.07 \le x \le 0.3$, $0.2 \le y \le 0.5$, $0.00 \le z \le 0.1$, $0.3 \le x+y+z \le 0.7$), wherein M is at least one selected from the group consisting elements Al, Mg, Fe, Cr, V, Ti, Mo, Sc, Ce and La.

18. The positive electrode active material for a lithium secondary battery according to claim 10, wherein, in the first interior of the secondary particle, the metal ion concentration is constant, and, in the second interior, at least one metal in the primary particle of the second interior has continuous concentration distribution in the primary particle.

19. The positive electrode active material for a lithium secondary battery according to claim 10, wherein at least one metal in the secondary particle has concentration gradient from the center to the surface of the secondary particle.

20. The positive electrode active material for a lithium secondary battery according to claim 10, wherein all metals in the secondary particle have concentration gradient from the center to the surface of the secondary particle.

21. The positive electrode active material for a lithium secondary battery according to claim 10, wherein the positive electrode active material as a secondary particle further comprises a surface maintaining layer, where the concentrations of all metal ions are constant.

22. A lithium secondary battery comprising any one positive electrode active material for a lithium secondary battery of claim 10.

23. The positive electrode active material precursor for a lithium secondary battery according to claim 1, wherein the average particle diameter of the secondary particle from 4 to 20 μm.

24. The positive electrode active material for a lithium secondary battery according to claim 10, wherein the average particle diameter of the secondary paritcle is from 4 to 20 μm.

* * * * *